(12) United States Patent
Alizadeh-Shabdiz et al.

(10) Patent No.: US 12,525,069 B1
(45) Date of Patent: Jan. 13, 2026

(54) EVENT DETECTION BY COMBINING TWO OR MORE DATA SOURCES ON A VEHICLE

(71) Applicant: Waylens, Inc., Waltham, MA (US)

(72) Inventors: Farshid Alizadeh-Shabdiz, Wayland, MA (US); Haowei Zhang, Weston, MA (US); Jon Verhaeghe, San Valley, ID (US); Christopher John Eller, Johns Island, SC (US); Gang Ding, Shanghai (CN)

(73) Assignee: WAYLENS, INC., Waltham, MA (US)

( * ) Notice: Subject to any disclaimer, the term of this patent is extended or adjusted under 35 U.S.C. 154(b) by 290 days.

(21) Appl. No.: 18/130,473

(22) Filed: Apr. 4, 2023

Related U.S. Application Data

(60) Provisional application No. 63/334,753, filed on Apr. 26, 2022.

(51) Int. Cl.
*G07C 5/00* (2006.01)
*G07C 5/08* (2006.01)

(52) U.S. Cl.
CPC ............. *G07C 5/008* (2013.01); *G07C 5/085* (2013.01)

(58) Field of Classification Search
CPC .................................. G07C 5/008; G07C 5/085
See application file for complete search history.

(56) References Cited

U.S. PATENT DOCUMENTS

| | | | |
|---|---|---|---|
| 2019/0147371 A1* | 5/2019 | Deo ........................ | G06N 20/20 706/12 |
| 2021/0125423 A1* | 4/2021 | Isaac ...................... | G07C 5/008 |

\* cited by examiner

*Primary Examiner* — Adnan M Mirza
(74) *Attorney, Agent, or Firm* — Maiorana Patent Law, PA

(57) ABSTRACT

An apparatus comprising an interface and a processor. The interface may be configured to receive a first event from a first source and a second event from a second source. The processor may be configured to request the second event in response to the first event and run a trained artificial intelligence model configured to aggregate at least the first event and the second event as input, perform operations on the input to evaluate the first event and generate a validation result for the first event in response to the input. The validation result may comprise a binary output. The trained artificial intelligence model may operate independently from the first source and the second source to enable the generation of the validation result to be performed separately from a detection of the first event. The validation result may provide an independent confirmation of an occurrence of the first event.

18 Claims, 8 Drawing Sheets

EVENT DETECTION BY COMBINING TWO OR MORE DATA SOURCES ON A VEHICLE

This application relates to U.S. Provisional Application No. 63/334,753, filed on Apr. 26, 2022, which is hereby incorporated by reference in its entirety.

FIELD OF THE INVENTION

The invention relates to vehicle data generally and, more particularly, to a method and/or apparatus for implementing event detection by combining two or more data sources on a vehicle.

BACKGROUND

With the advancement of technology, the price of cameras has been decreasing. The lower cost of cameras enables vehicles to be installed with multiple cameras to cover various places inside and outside of the vehicle. The configuration of multiple cameras includes any combination of a camera facing forward, a camera facing in-cabin, a camera facing to the side of the driver, a camera covering a back of the vehicle, a camera covering sides of the vehicle, a camera covering a cargo hold of a vehicle, etc. Each camera is capable of capturing video and audio. Vehicle sub-systems can use the video and audio to make various assumptions.

Vehicles are also equipped with other types of sensors that can produce a lot of data. Vehicle sub-systems are capable of processing the sensor data and the camera data to generate vehicle events. However, each vehicle sub-system operates under particular parameters that are not capable of handling all the circumstances that a vehicle or a driver can encounter. The limitations of the vehicle sub-systems can lead to false positive events or situations where an event is not properly detected.

It would be desirable to implement event detection by combining two or more data sources on a vehicle.

SUMMARY

The invention concerns an apparatus comprising an interface and a processor. The interface may be configured to receive a first processed event from a first data source and a second processed event from a second data source. The processor may be configured to request the second processed event in response to the first processed event and run a trained artificial intelligence model configured to aggregate at least the first processed event and the second processed event as input, perform operations on the input to evaluate the first processed event and generate a validation result for the first processed event in response to the operations on the input. The validation result may comprise a binary output. The trained artificial intelligence model may operate independently from the first data source and the second data source to enable the generation of the validation result for the first processed event to be performed separately from a detection of the first processed event. The validation result may provide an independent confirmation of an occurrence of the first processed event.

BRIEF DESCRIPTION OF THE FIGURES

Embodiments of the invention will be apparent from the following detailed description and the appended claims and drawings.

DETAILED DESCRIPTION OF THE EMBODIMENTS

Figure 1:
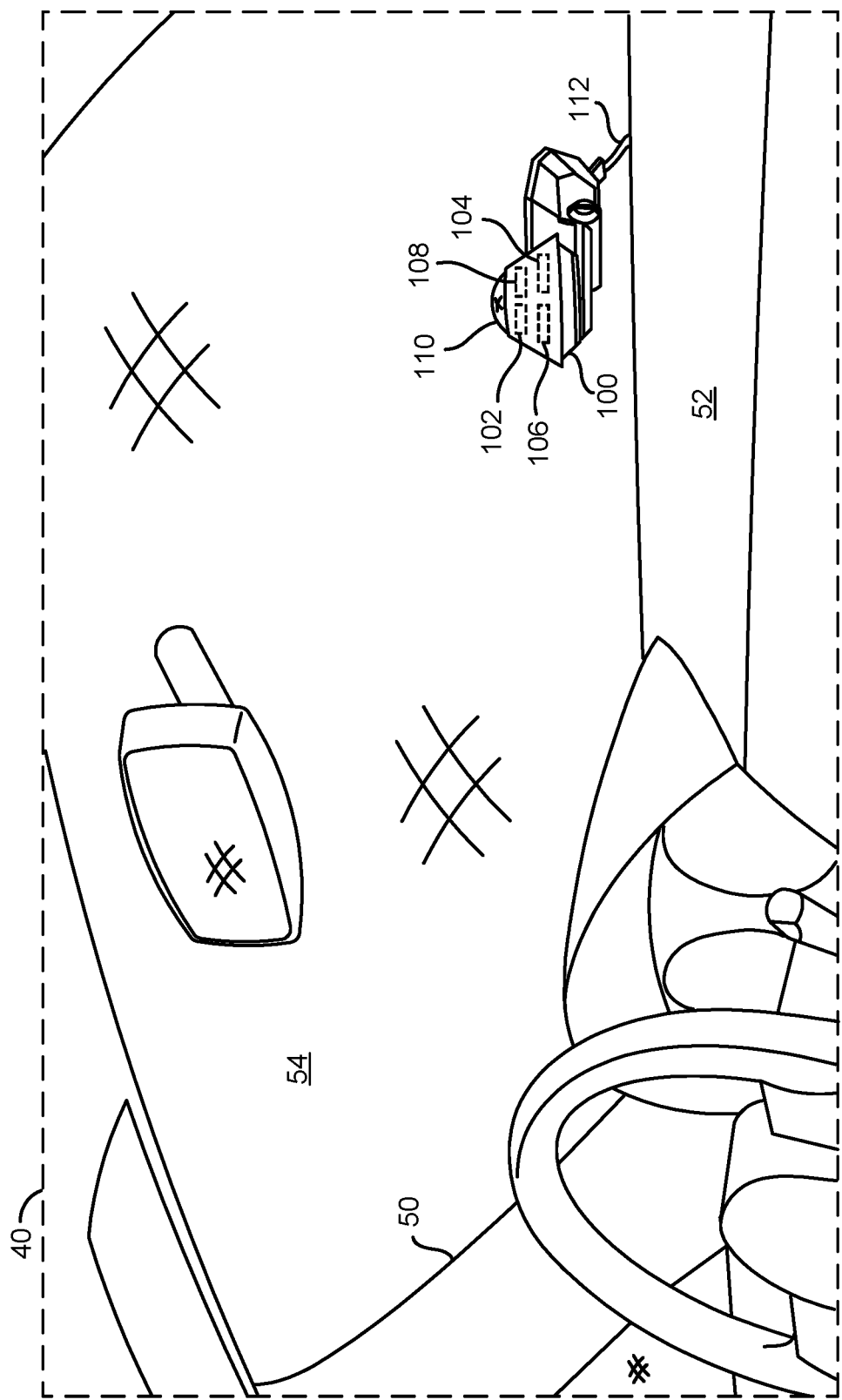
FIG. 1 is a diagram illustrating an example embodiment of the present invention.

Embodiments of the present invention include providing event detection by combining two or more data sources on a vehicle that may (i) validate a driving event, (ii) operate independently of a vehicle sub-system that generated each driving event, (iii) operate at a layer above a sensor layer in a vehicle, (iv) provide an independent confirmation that a driving event occurred using disparate sources of information, (v) implement a trained artificial intelligence model specialized to detect corner cases, (vi) detect false negatives or false positives generated by vehicle sub-systems, (vii) provide data for adjusting detection rates for vehicle events by each vehicle sensor sub-system, (viii) provide data for determining a severity of an event, (ix) be implemented in a fleet of vehicles and/or (x) be implemented as one or more integrated circuits.

Preferred embodiments of the present invention may be configured to validate driving events using artificial intelligence (AI) solutions. In an example, a processor may be implemented that is configured to run a trained AI model. The AI model implemented by the processor may operate as an AI based layer configured to validate driving events. The AI model implemented by the processor may be configured as a validation module. The validation module may operate as an independent validation layer (e.g., at a layer above a sensor layer) configured to confirm whether or not a detected driving event actually did occur.

The driving events may be detected by other modules (e.g., various vehicle sensor sub-systems). Other modules that detect an event may be AI based, neural network based, or not based on AI. In one example, a neural network based module may be used to detect cell phone usage by the driver (e.g., a neural network configured to perform computer vision operations). The output of the cell phone detection module may generate a positive detection event for cell phone detection that may be provided to the validation module. The validation module may implement the trained AI model configured to operate separate from other AI based solutions that detect the events. The trained AI model may comprise a neural network based solution configured to generate a validate result for the event. The validation result may be a binary output. For the example of the cell phone detection event, the validation result may report either a positive result (e.g., yes) if a cell phone was properly detected or a negative result (e.g., no) if the cell phone was not properly detected.

The validation layer may be configured to receive detected events (e.g., processed events, driving events, sensor events, etc.) from other modules. The other modules may comprise sensor systems and/or AI models configured to detect cell phone use, detect no-seatbelt, detect driver distraction, detect drowsiness of a driver, detect eating, detect smoking, etc. Inputs to the validation layer may be the detected event and/or all of the parameters (e.g., raw sensor data) associated with the event. For example, the detected event and/or the raw sensor data may comprise outputs of an event detection module (e.g., implemented at a layer below the validation layer). In one example, the driving event may be the detection of cell phone use and the driving event may comprise the confidence of detection and/or the location of the bounding box of the detected cell phone in the video frame used to detect the cell phone (e.g., the raw information that was used to detect the driving event). In another example, the parameters may comprise an image (or images) used to detect the driving event of cell phone use by the driver. The driving events may be received from disparate data sources (e.g., driving events from one camera may be used to validate driving events from another camera, driving events from a radar sensor may be used to validate driving events from an accelerometer, driving events detected within the vehicle cabin may be used to validate events that occur outside of the vehicle, etc.). The type of driving events detected, the data sources that provide the event and/or the data used to detect the driving events may be varied according to the design criteria of a particular implementation.

The validation module may be configured as a classifier. The classifier may output a result that indicates whether the driving event occurred or did not occur. The validation module may implement a binary classifier. For example, the validation result may be a binary classification. In some embodiments, the validation module may be extended to a multi classifier. In one example, the deep learning model may receive a cell phone detected event and the parameters associated with the cell phone detected event (e.g., some or all of the images that were used to detect the cell phone), and then output a binary decision for the validation result which may be 'yes, cell phone is there' or 'no, a cell phone is not there'.

The validation module may be implemented as an independent layer and/or an independent AI model. In one example, a separate AI model may be implemented by a camera (e.g., to perform computer vision operations) for detecting the cell phone use driving event. Implementing the AI model for the validation module independent from the sensor layer may enable the complexity of object detection (or other types of detection) to be separated from the complexity of object classification (e.g., the validation). For example, one AI model implemented for object detection may detect a cell phone use event and the validation layer may perform a classification of whether the cell phone use event has happened or not. The separation of detection and classification may enable event detection modules to be replaced (e.g., swapped with other similar modules) and still use the same validation layer. For example, there may be many solutions that may be implemented to detect a cell phone and any of the solutions may be used to detect a cell phone usage by the driver (e.g., analyzing audio), but the validation layer may be capable of independently verifying the existence of the cell phone in the picture or not, regardless of the solution used to detect the cell phone event.

The validation module may be configured to determine whether a detection of a driving event is correct or incorrect. In one example, classifying the detection as correct or incorrect may provide data that may be used to reduce the false alarm detection, and/or adjust an overall accuracy of a detection of a particular driving event. For example, the validation result may be used to calibrate various sensors and/or sensor sub-systems. Conventional sensor systems may provide the object detection and the classification integrated into the same model. For example, a deep learning model may detect a cell phone and, at the last layer(s) of the learning model, the classification may occur (e.g., the entire model may be trained together, which results in interdependency of the last classification and the detailed object detection). The validation module may be configured to enable the object detection to work independently (e.g., in whichever way a separate product manufacturer desires) and the classification layer implemented by the validation module may independently operate on top of the detection (e.g., independently detect the existence of the object), which may reduce the number of error reported in response to object detection.

Referring to FIG. 1, a diagram illustrating an example embodiment of the present invention is shown. An example view 40 of a vehicle 50 is shown. The example view 40 may comprise an interior 52 and an exterior 54 of the vehicle 50. A circuit 100 (e.g., an apparatus, a device, a system, etc.) is shown in the interior 52 of the vehicle 50. The apparatus 100 may be configured to implement event detection by combining two or more camera sources on a vehicle.

In the example shown, the apparatus 100 may implement a camera device. For example, the apparatus 100 may be implemented as a dash camera. In some embodiments, the apparatus 100 may be installed in the vehicle 50 as an after-market product. In some embodiments, the apparatus 100 may be pre-installed in the vehicle 50. In some embodiments, the apparatus 100 may be implemented as part of an infotainment center of the vehicle 50. For example, the apparatus 100 may be implemented in a cargo hold of the vehicle 50 (e.g., the vehicle 50 may be a delivery truck). In some embodiments, the apparatus 100 may not necessarily be implemented as a camera device. The implementation of the apparatus 100 may be varied according to the design criteria of a particular implementation.

The apparatus 100 may be configured to perform various operations and/or implement various functionality. In one example, the apparatus 100 may be configured to capture video. In another example, the apparatus 100 may be configured to perform computer vision operations. In yet another example, the apparatus 100 may be configured to record sensor data. In still another example, the apparatus 100 may be configured to implement one or more AI models. For example, one AI model may be configured to detect objects using computer vision and another AI model may be implemented to validate results. The apparatus 100 may be configured to receive driving events (e.g., from sensors implemented by the vehicle 50, from sources communicated from a source external to the vehicle 50, from a smartphone of a driver, etc.). The apparatus 100 may be configured to implement a sensor layer. The apparatus 100 may be configured to generate driving events via detection of sensors implemented by the apparatus 100 at the sensor layer. The apparatus 100 may be configured to implement a validation layer and/or a fusion layer. In an example, the apparatus 100 may implement the validation layer independently from the sensor layer.

The apparatus 100 may comprise a block (or circuit) 102, a block (or circuit) 104, a block (or circuit) 106 and/or a block (or circuit) 108. The circuit 102 may implement a processor. The circuit 104 may implement an interface. The circuit 106 may implement a memory. The circuit 108 may implement a sensor block (or sensor modules). The apparatus 100 may comprise other components (not shown). For example, the apparatus 100 may comprise a wireless communication device. The number, type, functionality and/or arrangement of the components of the apparatus 100 may be varied according to the design criteria of a particular implementation.

In the example shown, the apparatus 100 may comprise a lens 110 and a cable 112. The lens 110 may be configured to receive and/or focus light input. For example, the light captured by lens 110 may be used by the apparatus 100 to generate pixel data. The pixel data may be arranged as video frames. In some embodiments, a single lens 110 may be implemented. In some embodiments, multiple lenses may be implemented. In the example shown, the lens 110 may implement a 360 degree lens. The 360 degree lens may be configured to capture pixel data of the exterior 54 of the vehicle 50 and/or capture pixel data of the interior 52 of the vehicle 50. In some embodiments, the apparatus 100 may implement one lens directed out through a windshield to capture the exterior 54 and another lens directed at the interior 52 (e.g., to provide a field of view that captures a driver of the vehicle 50). Embodiments of the apparatus 100 that do not integrate a camera system, may not implement the lens 110. In some embodiments, the lens 110 may be used for a radar sensor instead of, or in addition to, a video camera.

The cable 112 may provide a connection for the apparatus 100 to one or more systems of the vehicle 50. In the example shown, one cable 112 may be implemented. However, the cable 112 may comprise multiple connectors. In some embodiments, multiple cables may be used to connect the apparatus 100 to the vehicle 50. In one example, the cable 112 may be configured to connect to a power system of the vehicle 50. For example, the vehicle 50 may provide a power supply for the apparatus 100. In another example, the cable 112 may be configured to connect to a communication system of the vehicle 50. For example, the cable 112 may connect to a Controller Area Network (CAN) bus of the vehicle 50. The cable 112 may enable the apparatus 100 to receive driving events detected by various sensor systems implemented by the vehicle 50.

The processor 102 may be configured to execute computer readable instructions. The processor 102 may be configured to read information from the interface 104 and/or the memory 106. The processor 102 may be configured to write information to the interface 104 and/or the memory 106. The processor 102 may be configured to run one or more AI models. The processor 102 may be configured to run an AI model configured to perform validation. In one example, the processor 102 may implement one AI model configured to perform object detection and another AI model configured to perform validation.

In some embodiments, the processor 102 may implement one or more coprocessors, cores and/or chiplets. For example, the processor 102 may implement one coprocessor configured as a general purpose processor and another coprocessor configured as a video processor. In some embodiments, the processor 102 may be a dedicated hardware module designed to perform particular tasks. In an example, the processor 102 may comprise hardware modules designed to implement application specific tasks for accelerated artificial intelligence operations. In some embodiments, the apparatus 100 may implement multiple processors. The processor 102 may be configured to perform particular tasks very efficiently and/or effectively. The processor 102 may be configured to perform operations that enable running an AI model (e.g., perform instructions and/or operations to run neural networks efficiently at an ASIC level and/or at a silicon level). In an example, the processor 102 may implement an AI accelerator. In some embodiments, other processors implemented by the apparatus 100 may be generic processors and/or video processors (e.g., a co-processor that is physically a different chipset and/or silicon from the processor 102). In one example, the processor 102 may implement an x86-64 instruction set. In another example, the processor 102 may implement an ARM instruction set. In yet another example, the processor 102 may implement a RISC-V instruction set. The number of cores, coprocessors, the design optimization and/or the instruction set implemented by the processor 102 may be varied according to the design criteria of a particular implementation.

The interface 104 may be configured to receive data from the processor 102 and/or the memory 106. The interface 104 may be configured to present data to the processor 102 and/or the memory 106. The interface 104 may be configured to receive driving events from the vehicle 50. The interface 104 may implement wired and/or wireless communication protocols. The interface 104 may be configured to communicate using one or more data formats. The interface 104 may be configured to translate and/or convert between various data formats. In some embodiments, the interface 104 may be connected to the cable 112. For example, the interface 104 may be configured to receive data in one format from the cable 112 and translate (or convert) the received data into a data format readable by the processor 102 and/or the memory 106. Similarly, the interface 104 may be configured to receive data in one format from the processor 102 and/or the memory 106 and translate (or convert) the received data into a data format that may be communicated using the cable 112 (e.g., to communicate data, such as re-calibration instructions, to the sensor layer). The method of communication of the interface 104 may be varied according to the design criteria of a particular implementation.

The memory 106 may provide data storage for the apparatus 100. The memory 106 may be configured to store the computer readable instruction that may be executed by the processor 102. The memory 106 may be configured to store video data, driving events and/or sensor parameters. The memory 106 may provide volatile and/or non-volatile storage. The memory 106 may provide mass data storage. The memory 106 may comprise embedded memory and/or removable storage. In an example, the memory 106 may implement a cache. In another example, the memory 106 may implement a SD card (or microSD card). The memory 106 may be configured to store training data for an AI model. The memory 106 may be configured to store one or more detection libraries that may be loaded into a computer vision detection AI model. The type and/or capacity of the memory 106 may be varied according to the design criteria of a particular implementation.

The sensor block 108 may comprise one or more sensor systems. In some embodiments, the apparatus 100 may implement one or more sensor devices. In some embodiments, the apparatus 100 may be implemented without sensors (e.g., the apparatus 100 may rely on receiving information from external sensors implemented by the vehicle 50). In one example, the sensor block 108 may implement a G-force sensor. In another example, the sensor block 108 may implement an accelerometer. In yet another example, the sensor block 108 may implement a gyroscope. In still another example, the sensor block 108 may implement a GPS device. In another example, the sensor block 108 may implement a microphone and/or audio processor. In some embodiments, the sensor block 108 may comprise a combination of different sensors. The number of sensors implemented and/or type of data collected by the sensor block 108 may be varied according to the design criteria of a particular implementation.

The interface 104 may be configured to receive camera information. In some embodiments, the processor 102 may generate the camera information. The camera information may be used to detect driving events. The camera information may comprise information captured by the camera. For example, the camera information may comprise videos, pictures and/or any other form of information that may be derived from images captured by the camera. In an example, the camera information may comprise driving events based on detected objects and/or driving scenarios generated using computer vision. In another example, the camera information may comprise EXIF data (e.g., time, date, location, camera information, etc.). Generally, the camera implemented by the apparatus 100 may be configured to capture video images and/or still images. In some embodiments, the apparatus 100 may further capture audio.

The interface 104 may be configured to receive events (e.g., driving events). An event may be any type of information that may be reported by a sensor and/or sub-system. In some embodiments, the events may be information that a user of a camera system may be interested to know directly or indirectly. Directly interested information may be output which directly goes to a user. Indirectly interested information may be output that may be used to derive information that the user may be interested in. Examples of driving events that may be directly interested information may be accidents, driver distraction, driver drowsiness, etc. Examples of driving events that may be indirectly interested information may be camera generated events used to calculate a driver score and/or other parameters interested by users. In another example, the driving events may comprise a detection of cell phone use (e.g., detected using computer vision). In yet another example, the driving events may comprise a harsh brake (e.g., detected by a G-force sensor). In still another example, the driving events may comprise a rapid acceleration (e.g., detected by an accelerometer). In another example, the driving events may comprise a traffic jam (e.g., detected from external traffic monitoring data). The number and/or types of driving events detected may be varied according to the design criteria of a particular implementation.

Figure 2:
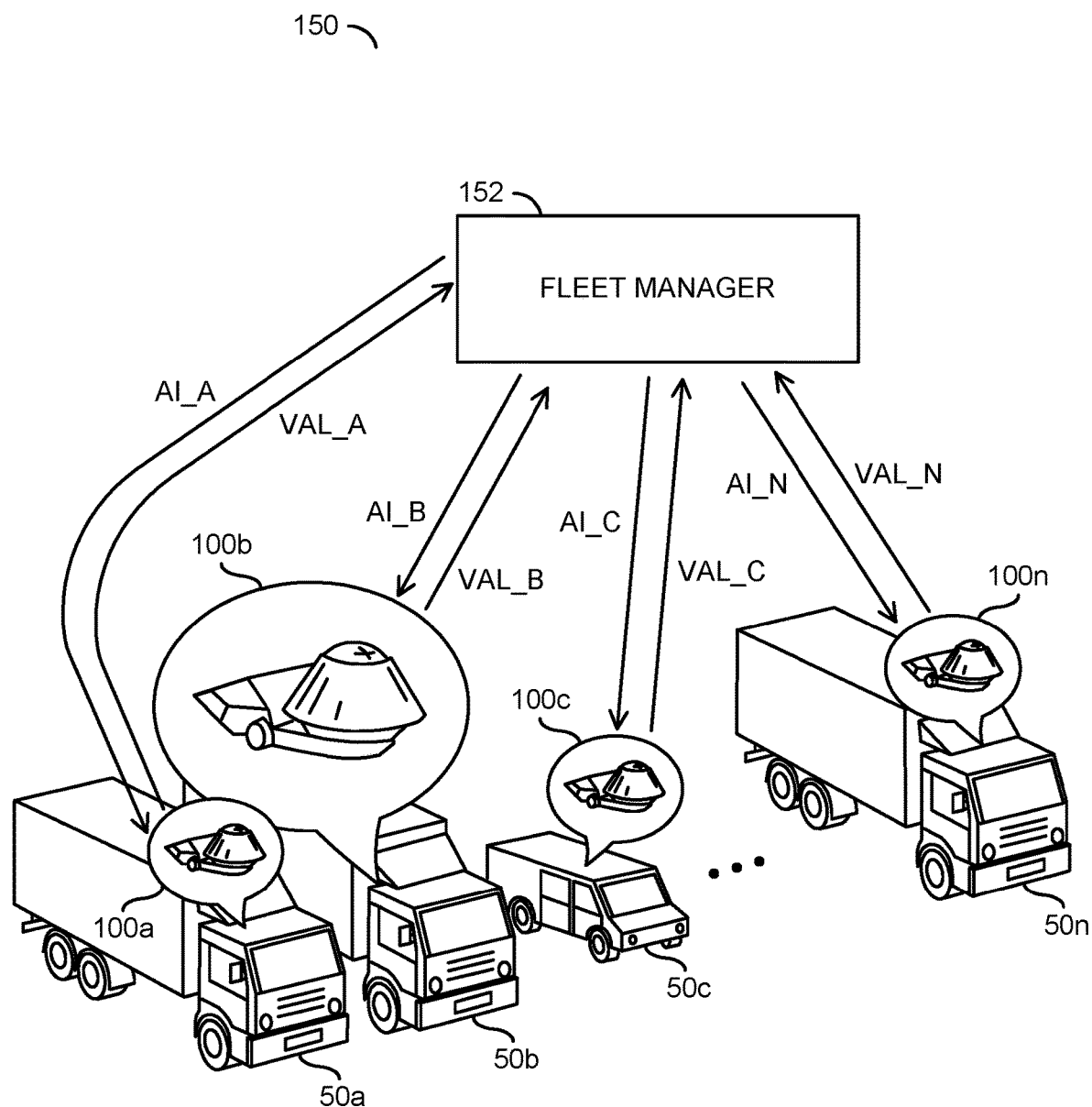
FIG. 2 is a diagram illustrating an apparatus implemented in each vehicle of a fleet of vehicles.

Referring to FIG. 2, a diagram illustrating an apparatus implemented in each vehicle of a fleet of vehicles is shown. A vehicle fleet 150 is shown. The vehicle fleet 150 may comprise a number of vehicles 50a-50n and a fleet manager 152. In the example shown, the vehicles 50a-50n may comprise a combination of delivery trucks and delivery vans. In an example, the vehicle fleet 150 may be implemented for a delivery service (e.g., parcel delivery). In some embodiments, the vehicle fleet 150 may be a taxi fleet, a service fleet (e.g., vehicles for cable/internet installation), a vehicle rental fleet, etc.

Each of the vehicles 50a-50n may implement a respective one of the apparatuses 100a-100n. For example, each of the vehicles 50a-50n may be configured to generate vehicle events (e.g., via the apparatuses 100a-100n and/or sensor systems of the vehicles 50a-50n). In some embodiments, each of the vehicles 50a-50n may implement more than one of the apparatuses 100a-100n. For example, the vehicle 50a may implement one of the apparatuses 100a-100n in a vehicle cabin and another one of the apparatuses 100a-100n in a cargo hold. The vehicle events for each of the vehicles 50a-50n may be validated using the respective apparatuses 100a-100n. For example, each of the apparatuses 100a-100n may implement the AI model for generating validation results.

Each of the apparatuses 100a-100n may be configured to generate a respective signal (e.g., VAL_A-VAL_N). The signals VAL_A-VAL_N may comprise validation results. Each of the apparatuses 100a-100n may independently evaluate, confirm and/or classify the detected driving events. The apparatuses 100a-100n may communicate the validation results VAL_A-VAL_N to the fleet manager 152. The fleet manager 152 may receive the validation results VAL_A-VAL_N, which may be used for evaluating performance of the vehicle fleet 150 and/or a performance of individual drivers of the vehicles 50a-50n. The fleet manager 152 may be one example of a user. A user may be a person and/or people that may perform various tasks based on data generated by the vehicles 50a-50n and/or the apparatuses 100a-100n. In an example, the tasks may comprise getting output of a camera system, looking at the output or some of the outputs, analyzing the output, deriving some conclusions from the output, etc. The fleet manager 152 may be an owner of a fleet, a safety manager of a fleet, a manager of a taxi company, an insurance agent in an insurance company, a driver supervisor, a driver trainer, the driver, etc.

The fleet manager 152 may analyze the results of the various driving events. The validation results VAL_A-VAL_N may provide independent confirmation of the driving events detected. The driving events may be any type of event that may be interesting to a driver and/or the fleet manager 152. For example, the driving events may comprise a harsh brake, a harsh acceleration, a sharp turn, driver distraction, phone use by the driver, forward collision warning, tailgating, an amount of time idling, etc. In an example, the fleet manager 152 may have a baseline of occurrences for various driving events (e.g., harsh brakes). If one of the vehicles 50a-50n is reporting an outsized number of validated results that confirm harsh brakes, then the fleet manager 152 may have cause to investigate the issue. For example, the driver that is performing many harsh brake driving events may be a candidate for retraining.

Each of the apparatuses 100a-100n may be configured to receive a respective signal (e.g., AI_A-AI_N). The signals AI_A-AI_N may comprise AI model updates. In the example shown, the signals AI_A-AI_N may be received from the fleet manager 152. In some embodiments, the signals AI_A-AI_N may be generated by a developer of the apparatuses 100a-100n. The AI model updates provided by the signals AI_A-AI_N may be configured to update the parameters used by the AI models. Updating the AI models implemented by the apparatuses 100a-100n may maintain an accuracy and/or improve an accuracy of the validation results generated. In an example, as more and more driving events are detected and/or validated, the fleet manager 152 may gain additional knowledge, expertise and/or training data for performing detections and/or classifications. As more information is aggregated, the AI models may be better suited to detecting corner cases (e.g., a corner case scenario). Corner cases may be driving events that may occur infrequently and/or may be easily confused with other driving events. Corner cases may be a narrow subset of detection. For example, with insufficient data, a sunlight reflection may prevent proper detection of a seatbelt being worn. The corner case detection implemented by the apparatus 100 may enable accurate detection of a seatbelt being worn in varying light conditions.

In some embodiments, the fleet manager 152 may monitor many (e.g., 20, 30, 80, 100, 300, thousands, etc.) of the vehicles 50a-50n. The apparatus 100a-100n may be implemented in each of the vehicles 50a-50n. The fleet manager 152 may want to know how each and every driver is doing and various vehicle sensors may provide many driving events and incident recordings (e.g., events such as harsh brakes, collisions, fast acceleration, etc.). The fleet manager 152 may want to know about these events, but may not have the time to evaluate each event detected. For example, if a harsh brake occurs once a month, that may be acceptable to the fleet manager 152 but if a particular driver has many more harsh brake events than other drivers, then the driver may need retraining.

The apparatuses 100a-100n may enable the fleet manager 152 to sort the various driving events. For the example of the harsh brake, a harsh brake may be an acceptable driving event if there is a large pothole in the road. However, the driving events may not provide any context about the harsh brake event. If there was not a large pothole, then the driver may have been driving aggressively, resulting in an unnecessary harsh brake that was the result of bad driving. The apparatuses 100a-100n may be configured to remove the false alarms (e.g., the fleet manager 152 may not want to see multiple harsh braking events that were caused by good driving, the fleet manager 152 may care about the multiple harsh braking events that were caused by bad driving). In some embodiments, the fleet manager 152 may want to see more aggressive driving in some circumstances (e.g., to meet delivery deadlines). For example, the fleet manager 152 may want to see more fast acceleration events, or may want to see particular routes taken to avoid traffic. The apparatuses 100a-100n may enable the fleet manager 152 to receive the most important driving events instead of seeing all events (e.g., avoid spending hours reviewing driving events).

Figure 3:
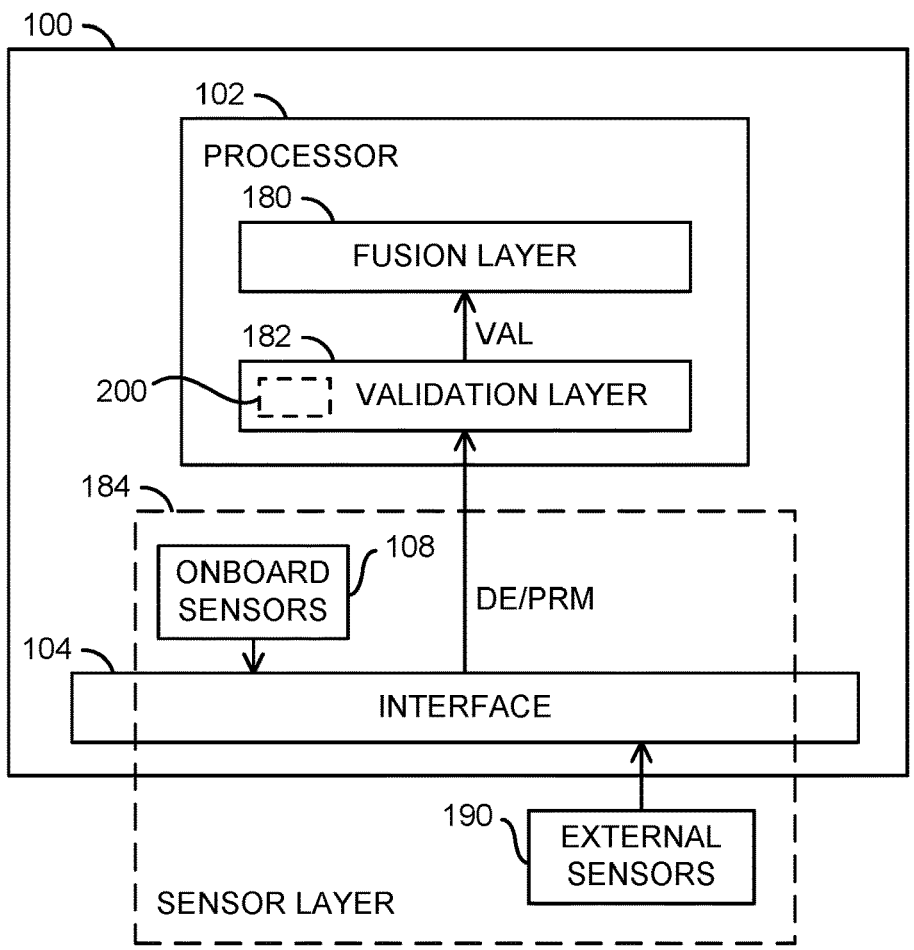
FIG. 3 is a block diagram illustrating a validation layer implemented by a processor.

Referring to FIG. 3, a block diagram illustrating a validation layer implemented by a processor is shown. The apparatus 100 is shown. The apparatus 100 may comprise the processor 102, the interface 104 and/or the onboard sensors 108. The apparatus 100 may comprise other components such as the memory 106 (not shown).

The processor 102 may comprise a block (or circuit) 180 and/or a block (or circuit) 182. The block 180 may comprise a fusion layer. The block 182 may comprise a validation layer. The fusion layer 180 and the validation layer 182 may comprise conceptual blocks that may be implemented using a combination of hardware modules and/or programmable modules implemented by the processor 102.

The apparatus 100 may partially implement a block (or circuit) 184. The block 184 may implement a sensor layer. The sensor layer 184 may be implemented by the apparatus 100 (e.g., the onboard sensors 108) and implemented by other sensors of the vehicle 50. A block 190 is shown. The block 190 may comprise the external sensors. The external sensors 190 may be implemented off-device from the apparatus 100. The external sensors 190 may be implemented by the vehicle 50 (e.g., data communicated over a CAN bus). The external sensors 190 may be data generated by third party sources (e.g., map service, traffic information, a weather service, emergency alerts, etc.). Details of the fusion layer 180, the validation layer 182, the sensor layer 184 and/or other details of the apparatus 100 may be described in association with U.S. Provisional Application No. 63/334,753, filed on Apr. 26, 2022, which is incorporated by reference in its entirety.

Generally, the fusion layer 180 may be a top layer compared to the validation layer 182. The validation layer 182 may operate at a level above the sensor layer 184. At the sensor layer 184, the interface 104 may receive driving events. The driving events may be generated by the onboard sensors 108 and/or the external sensors 190. The driving events may be received from disparate sources. In some embodiments, the driving events may comprise processed events. The processed events may comprise driving events that have been determined by the sensors. In one example, the onboard sensors 108 may comprise a G-force sensor, which may detect a processed event of a harsh brake. For example, the harsh brake may be defined by the G-force sensor as a pre-determined amount of force in a direction opposite to the forward motion of the vehicle 50. The processed event may comprise the detection of the harsh brake. In some embodiments, the sensor layer 184 may provide the parameters that may have been used to determine the processed events. For the example of the harsh brake, the parameters may comprise the amount of force measured, the amount of time that the force was detected, the direction of the force etc. (e.g., the raw data). In another example, the processed event may comprise the detection of driver drowsiness. The driver drowsiness may have been detected in response to computer vision operations performed on video of the driver captured within the interior 52 of the vehicle 50. The parameters associated with the 'driver drowsiness' driving event may comprise the video frames analyzed, the locations of the bounding boxes that correspond to the detection of the face and eyes and/or the confidence values used to determine whether there was drowsiness. The sensor layer 184 may provide the interface 104 with the processed driving event and/or the parameters.

A signal (e.g., DE/PRMS) may be generated by the interface 104. The signal DE/PRMS may comprise the driving events and/or the parameters generated by the sensor layer 184. In some embodiments, the signal DE/PRMS may comprise the driving events only. In some embodiments, the signal DE/PRMS may comprise the driving events and the associated parameters. The types of driving events and/or the associated parameters communicated via the signal DE/PRMS may be varied according to the design criteria of a particular implementation.

The validation layer 182 may be configured to receive the driving events. The validation layer 182 may be configured to generate the signal VAL in response to an analysis of the signal DE/PRMS. The signal VAL may be one of the signals VAL_A-VAL_N shown in association with FIG. 2.

The fusion layer 180 may be configured to make decisions. Generally, the fusion layer 180 may receive at least two inputs from disparate sources. The fusion layer 180 may make decisions based on considering combined inputs/sources. For example, the fusion layer 180 may be configured to make decisions based on the combination of the disparate sources of information that would not have been able be determined based on each one of the disparate sources alone.

Ideally, the fusion layer 180 may receive all possible information (e.g., the validation results VAL, data from the onboard sensors 108, data from the external sensors 190, etc.). For example, the fusion layer 180 may receive information from cameras, GPS, and other sensors of the vehicle 50. The fusion layer 180 may also receive data from outside sources (e.g., weather condition, street type, traffic, etc.). The fusion layer 180 may be configured to detect an event and/or a severity of the event. The various data sources may be part of the logic used by the fusion layer 180 for detecting an event and/or the severity. The fusion layer 180 may be configured to generate a confidence value for each of the generated events. The confidence value may be a quality of the estimation of the event. The confidence value may be used to filter events with low confidence and/or may be passed to the end user as another parameter associated with reported events.

The validation layer 182 may comprise a block (or circuit) 200. The block 200 may comprise an AI model. The AI model 200 may be a trained AI model for performing the validation. The AI model 200 may be an independent AI model trained specifically for determining the validation results. For example, the AI model 200 may operate independently from a convolutional neural network that may be implemented for performing computer vision operations in order to detect objects in video frames. The AI model 200 may be configured to provide an independent confirmation that a driving event occurred using disparate sources of information received from the sensor layer 184.

The interface 104 may be configured to receive at least one processed event in the signal DE/PRMS. The processed event may be generated by a data source (e.g., the onboard sensors 108, the external sensors 190, a third party data source, etc.). In some embodiments, the processor 102 may request another processed event. In some embodiments, the interface 104 may receive multiple driving events at the same time. Each of the driving events may be timestamped. The processor 102 may analyze a number of events that occurred near the same timestamp in order to validate one of the driving events. For example, if a harsh brake driving event occurred at timestamp X, the processor 102 may further analyze other driving events that occurred either at timestamp X and/or other driving events that occurred within temporal proximity to timestamp X (e.g., all driving events that occurred between the timestamp X−Y and the timestamp X+Y).

The processor 102 may run the AI model 200. The AI model 200 may be configured to aggregate the processed events. In an example, the AI model 200 may aggregate the driving event under investigation (e.g., the harsh brake event) and the other driving events (e.g., objects detected, radar proximity events, map data, etc.). In one example, the AI model 200 may validate one processed driving event with at least one other processed driving event. Generally, the AI model 200 may perform validation of a particular driving event based on a combination of multiple other driving events. The processed driving events and/or the parameters associated with the driving events may be used as input for the AI model 200. In some embodiments, the AI model 200 may provide contextual data for the processed driving event (e.g., based on the raw data that corresponds with the driving event and/or a combination of the raw data and additional other driving events).

The AI model 200 may perform operations on the input (e.g., the driving events in the signal DE/PRMS). The operations may evaluate one of the processed driving events (e.g., the driving event under investigation). For example, the driving event detected (e.g., the harsh brake) may be evaluated based on the other driving events detected. The AI model 200 may generate the validation result VAL. The validation result VAL may be a classification of the driving event under investigation. For example, the AI model 200 may receive the driving event for the harsh brake, use other driving events to evaluate the harsh brake driving event and then generate the validation result for the harsh brake. The validation result VAL may not necessarily validate the other driving events that were used to evaluate the validity of the potential driving event under test. The validation result VAL may provide a validation result for one particular driving event. However, the AI model 200 may be configured to validate multiple driving events in parallel (or substantially in parallel).

The validation result VAL may be a binary output. For example, the validation result may comprise a positive result (e.g., a yes, a logical one/high, etc.) or a negative result (e.g., a no, a logical zero/low, etc.). Generally, the AI model 200 may evaluate the processed driving event by determining a probability value. In an example, the probability value may be a value between 0.0 and 1.0. The AI model 200 may operate according to a validation threshold value. The validation threshold value may be a value selected by a user and/or a designer of the AI model 200. In one example, the validation threshold may be a value of 0.90. Other validation threshold values may be used (e.g., 0.6, 0.8, 0.95, 0.99, etc.). A higher validation threshold may result in fewer positive results (e.g., may result in fewer false positives, but may miss some properly detected driving events). Conversely, a lower validation threshold may result in more events being validated, but may result in more false positive results. The AI model 200 may compare the probability value determined for the processed driving event with the validation threshold (e.g., determine whether the probability value for the harsh brake event is greater than the 0.90 validation threshold). The binary output of the validation result may provide an independent confirmation of the detected event when the probability value is greater than the validation threshold.

The AI model 200 may operate independently from the onboard sensors 108, the external sensors 190 and/or any other data sources (e.g., the computer vision operations). Operating the AI model 200 independently from the data sources may enable the validation result VAL to be performed separately from the detection of the driving events. For example, changing parameters and/or an implementation how the events may be detected may not affect the operations performed by the AI model 200. The functionality of the AI model 200 may not be affected by any changes to the sensor layer 184. For example, the AI model 200 may be platform agnostic. The validation result VAL may provide an independent confirmation of the processed driving event. For example, performing the validation separate from the detection may enable the AI model 200 to be adjusted without directly affecting the detection of the driving events by the sensors. Similarly, performing the validation separate from the detection may enable the sensors (or the AI models implemented to perform detection) to be adjusted without directly affecting the validation of the driving events by the AI model 200.

The AI model 200 implemented by the validation layer 182 may compliment and/or modify generic AI models that may be implemented by the various data sources in the sensor layer 184. The AI model 200 may be configured to enable the validation layer 182 to tailor the detection results generic AI models from a previous detection solution to be used for detecting corner cases. In some embodiments, the onboard sensors 108 and/or the external sensors 190 may be calibrated in response to the validation results.

The AI model 200 may be trained in response to training data that provides an independent analysis from results determined in the sensor layer 184. In an example where the onboard sensors 108 and/or the external sensors 190 provide driving events in response to separate AI models implemented at the sensor layer 184, the AI model 200 may be trained to provide a secondary analysis (e.g., provide a sober second interpretation and/or provide a second set of 'eyes'). The training data for the AI model 200 may comprise data from at least two sources. In one example, the data source for the training data for the AI model 200 may comprise labeled data about all the false alarms that the layer below (e.g., the sensor layer 184) detected incorrectly. For example, the training data may comprises instances that a computer vision neural network detected a cell phone incorrectly (e.g., classified a seatbelt buckle as a cell phone). In another example, the data source for the training data for the AI model 200 may comprise labeled data about all the missed detections from the layer below (e.g., the generic solution from the sensor layer 184). In an example, the training data may comprise instances that a computer vision neural network did not detect a cell phone when a driver actually was using a cell phone. The source of the training data and/or the examples of the labeled training data may depend on the particular source that provides the driving events (e.g., computer vision detections, harsh brake detections, lane departure detections, etc.). The source of the training data and/or the examples of the labeled training data may be varied according to the design criteria of a particular implementation.

The validation layer 182 may provide another layer of protection against false positive detections by one of the data sources that provides the processed driving events. The validation layer 182 may receive a potential driving event and then use the other driving events received in order to judge whether the potential driving event was properly detected. The validation layer 182 may determine that either the potential driving event did happen or that the potential driving event did not happen. If the potential event is determined to not have happened, then the potential driving event may have been a false positive. For example, the validation result may be used in order to calibrate the data source to a higher detection threshold. Similarly, the validation results provided by the validation layer 182 may be used to increase a detection rate in response to the potential driving event. For example, the validation result may be used in order to calibrate the data source to a lower detection threshold (e.g., so that more driving events may be captured). In some embodiments, the validation layer 182 may enable the data sources to be calibrated for a higher detection rate because the validation layer 182 may be capable of providing the additional layer of filtering of the events with better accuracy than may have been provided at the data source. For example, the validation layer 182 may be configured to capture mistakes that may be made in detecting the driving events at the data source.

Figure 4:
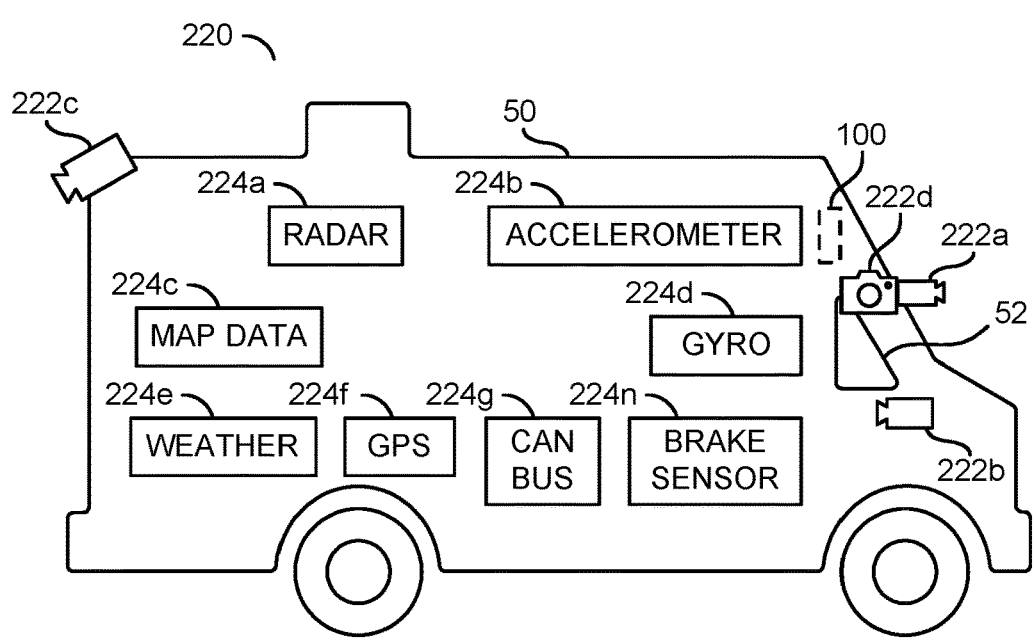
FIG. 4 is a diagram illustrating sources of data in a vehicle.

Referring to FIG. 4, a diagram illustrating sources of data in a vehicle is shown. A conceptual view 220 of the vehicle 50 is shown. The conceptual view 220 may provide an illustrative example of various sources of data that may be used to generate the driving events. The apparatus 100 is shown installed in the vehicle 50.

The vehicle 50 may comprise camera systems 222a-222d. In an example, the vehicle 50 may comprise the camera systems 222a-222d in addition to a camera system implemented by the apparatus 100. In the example shown, the camera system 222a may be a forward facing camera, the camera system 222b may be a rear side view camera (e.g., a blindspot camera), the camera system 222c may be a rear view camera and the camera system 222d may be a passenger side view camera. Other camera systems may be implemented (e.g., a camera system configured to capture the interior 52, a camera system configured to capture a cargo hold of the vehicle 50, a camera system implemented on a driver side of the vehicle 50, etc.). For example, the AI model 200 may be configured to combine camera information (e.g., video data, audio data and/or camera statistics, etc.) taken by two or more cameras of the camera systems 222a-222d installed on the vehicle 50 in order to provide information about events that the end user may be interested to know and/or increase an accuracy of the information delivering to the user. The number of cameras 222a-222d implemented in and/or on the vehicle 50 may be varied according to the design criteria of a particular implementation.

The vehicle 50 may comprise a number of blocks (or circuits) 224a-224n. The circuits 224a-224n may comprise data sources. In an example, the circuits 224a-224n may comprise examples of the external sensors 190 shown in association with FIG. 3. In the example shown, the data source 224a may be a radar device, the data source 224b may be an accelerometer, the data source 224c may be map data, the data source 224d may be a gyroscope, the data source 224e may be weather information, the data source 224f may be a GPS/GNSS device, the data source 224g may be a CAN bus, the data source 224n may be a brake sensor, etc. Other data sources 224a-224n and/or additional data sources may be implemented (not shown). The number and/or type of the data sources 224a-224n implemented may be varied according to the design criteria of a particular implementation.

The AI model 200 may be configured to combine at least two sources of information. In an example, data from the forward camera 222a may be combined with data from the brake sensor 224n in order to validate the harsh brake event. In another example, data from the side camera 222b may be combined with data from the radar 224a in order to validate a risky lane change. In yet another example, data from the passenger side camera 222d may be combined with data from an impact sensor in order to validate a broadside collision. Other combinations of driving event data received from various other data sources may be used for validation. Each camera feed may be used as one source of driving information. Another AI module may be used as one source of driving information (e.g., each feed of video may be processed with an AI module capable of computer vision detection to provide driving events).

In some embodiments, one source of data may be configured to provide multiple different types of driving events. In one example, the video feed may provide video frames of the interior 52 of the vehicle 50 (e.g., the video frames may be included as part of the raw data provided to the AI module 200). A separate computer vision AI module may be one of the data sources 224a-224n. For example, the computer vision AI module (may be implemented by one of the cameras 222a-222d, may be implemented within the apparatus 100, may be implemented by an embedded chip on the vehicle 50, etc.) may process the in-cabin video to detect various behaviors (e.g., detect phone use, detect drinking, detect smoking, detect seatbelt usage, detect driver drowsiness, detect driver distraction, etc.). Each of the types of detection may be one of the driving events communicated as the signal DE/PRM to the AI module 200. For example, a collision event may be validated using at least one other driving event and potentially more driving events. In an example, the collision event may be validated by a driving event of detecting driver drinking and/or a driving event of driver drowsiness (e.g., two separate driving events provided by the same AI module that performs computer vision).

In another example, the video feed (e.g., from the lens 110 and/or from the external camera 222a) may provide video frames of the exterior environment 54 of the vehicle 50 (e.g., the video frames may be included as part of the raw data provided to the AI module 200). A separate computer vision AI module may be one of the data sources 224a-224n. For example, the computer vision AI module (may be implemented by one of the cameras 222a-222d, may be implemented within the apparatus 100, may be implemented by an embedded chip on the vehicle 50, etc.) may process the video frames from the forward looking camera to provide Advanced Driver Assistance System (ADAS) functionality for driving events (e.g., detect forward collision warning, detect lane departure, detect tailgating, detect traffic sign detection, detect traffic lights, etc.). Similarly, for the passenger side camera 222d, vehicle and object detection may be the driving events. Similarly, for the rear camera 222c, vehicle detection and/or object detection may be the driving events (and the parameters may comprise the distance measured to the detected objects). In an example, a harsh brake driving event detected may be validated by the AI module 200 based on a driving event from a computer vision AI module that detected a red light. In another example, a harsh brake driving event detected may be validated by the AI module 200 based on another driving event from a computer vision AI module that detected tailgating. For example, tailgating alone may not be sufficient to infer that a harsh brake occurred, but given a harsh brake event the tailgating detection may be sufficient to validate that the harsh brake was properly detected.

The data sources 224a-224n may each provide driving events. The data sources 224a-224n may comprise an accelerometer, a gyroscope, a magnetometer, etc. The data sources 224a-224n may comprise a GPS, which may comprise location and/or other information that a GPS unit provides (e.g., map data, traffic data, speed data, etc.). The CAN bus 224g may provide vehicle information (e.g., engine status (on/off status), turn signal, brake information, etc.). The data sources 224a-224n may comprise other third party contextual information. External contextual data may be data received from sources besides the vehicle (e.g., weather conditions, type of the street, road conditions, traffic information, risk level of roads, etc.). External contextual data may be provided by a smartphone and/or the vehicle infotainment center (e.g., smartphones may be equipped with many sensors and smartphones and/or infotainment centers may connect to external sources of information). In an example, a smartphone equipped with an accelerometer and/or a gyroscope may comprise the data source that may capture acceleration. For example, the acceleration data from the smartphone may be used to validate an acceleration driving event generated by the accelerometer 224b implemented by the vehicle 50.

In some embodiments, one or more of the data sources (e.g., the onboard sensors 108, the cameras 222a-222d and/or the data sources 224a-224n) may implement an AI layer (e.g., to provide the processed driving events). For example, the AI layer implemented for the various data sources may be a generic third party AI model. Generally, there may be multiple product vendors that each implement libraries for AI models. Each product vendor may provide the third party AI models. The third party AI models may be trained on generic training data. The AI model 200 may be independently trained. The AI model 200 may be trained based on particular situational data. For example, the data sources may be trained to detect events based on one set of training data, while the AI model 200 implemented by the validation layer 182 may be trained using another set of training data. By training the AI model 200 independently from any AI models used in the sensor layer 184, the validation layer 182 may provide validation for use cases that may not be captured (or captured accurately) by the sensor layer 184. For example, the AI model 200 may be trained for specific use cases desired by the fleet manager 152 and/or another user. In an example, one AI model implemented in the sensor layer 184 may be configured to detect cell phones based on video frames alone, and another AI model implemented in the sensor layer 184 may be configured to analyze G-force measurements based on force measurements alone, while the AI model 200 at the validation layer 182 may use information from both of the data sources.

In some embodiments, the AI model 200 may be configured to determine a severity of the driving event. For example, the brake sensor 224n may provide the harsh brake driving event. The validation layer 182 may receive other driving events from the onboard sensors 108, the cameras 222a-222d and/or the data sources 224a-224n which may be used to provide context to the harsh brake driving event. For example, the detection of a nearby vehicle detected using a proximity event from the radar data source 224a, may indicate that an object was close to the vehicle 50. A close object in addition to a harsh brake may provide context and the AI model 200 may contextualize the harsh brake driving event as a severe event. Similarly, the radar data source 224a may indicate that an object was close to the front of the vehicle 50 for a particular amount of time (e.g., indicating the driver of the vehicle 50 was tailgating another vehicle). The tailgating in addition to a harsh brake may provide context and the AI model 200 may contextualize the harsh brake driving event as a user-fault event (e.g., an event that should have been unnecessary if not for the poor driving habits of the driver). Another example of severity may be the detection of cell phone usage. The interior camera 222b may provide video frames that an AI model may use to detect driver cell phone usage. The AI model 200 may receive the cell phone use driving event and then additionally receive a detection from the forward camera 222a. In one example, if the AI model implemented by the forward camera 222a detects that the vehicle 50 is driving through an intersection, the cell phone usage may be classified by the validation layer 182 as a severe event. In another example, if the AI model implemented by the forward camera 222a detects that the vehicle 50 is driving the speed limit on an empty road, then the cell phone usage may be classified by the validation layer 182 as low severity. In yet another example, if the AI model implemented by the forward camera 222a detects that the vehicle 50 is driving the speed limit on an empty road but the weather data source 224e reports a rainy weather event, then the validation layer 182 may change the low severity cell phone usage event to a moderate severity cell phone usage event. The contextual data may be useful for evaluating a driver by the fleet manager 152. The types of driving events and/or the various factors that are used to contextualize the severity of the event may be varied according to the design criteria of a particular implementation.

The corner cases detected by the AI model 200 may enable validation in particular conditions that may not be handled at the sensor layer 184. In an example, the cameras 222a-222d may be configured to detect cell phone usage by the driver. Many generic third party AI libraries may be capable of detecting cell phone usage. The generic third party AI detection libraries may be capable of detecting cell phone usage in general conditions, but may fail in specific lighting conditions (e.g., when there is lots of red light in the environment, when bright lighting conditions cause reflections, etc.). The AI model 200 may perform the validation that may properly detect the cell phone usage in the specific lighting conditions with lots of red light. The specific lightning conditions may be one example of a corner case. For example, the AI models in the sensor layer 184 may analyze the video frames all the time and provide driving events related to cell phone usage. The AI models in the sensor layer 184 may be better than the AI model 200 at generally detecting cell phone usage. However, the AI model 200 may be trained to focus on the corner case of the specific lighting condition. The AI model 200 may be very accurate for the particular corner cases. In an example, the AI model in the sensor layer 184 may detect cell phone usage in a red light environment. The signal DE/PRM may provide the detection result and the video frames. The AI model 200 may detect the corner case of red light environment and determine that a shadow of the seatbelt was actually detected and not a cell phone. The validation result may be a negative result (e.g., dismiss the driving event).

Figure 5:
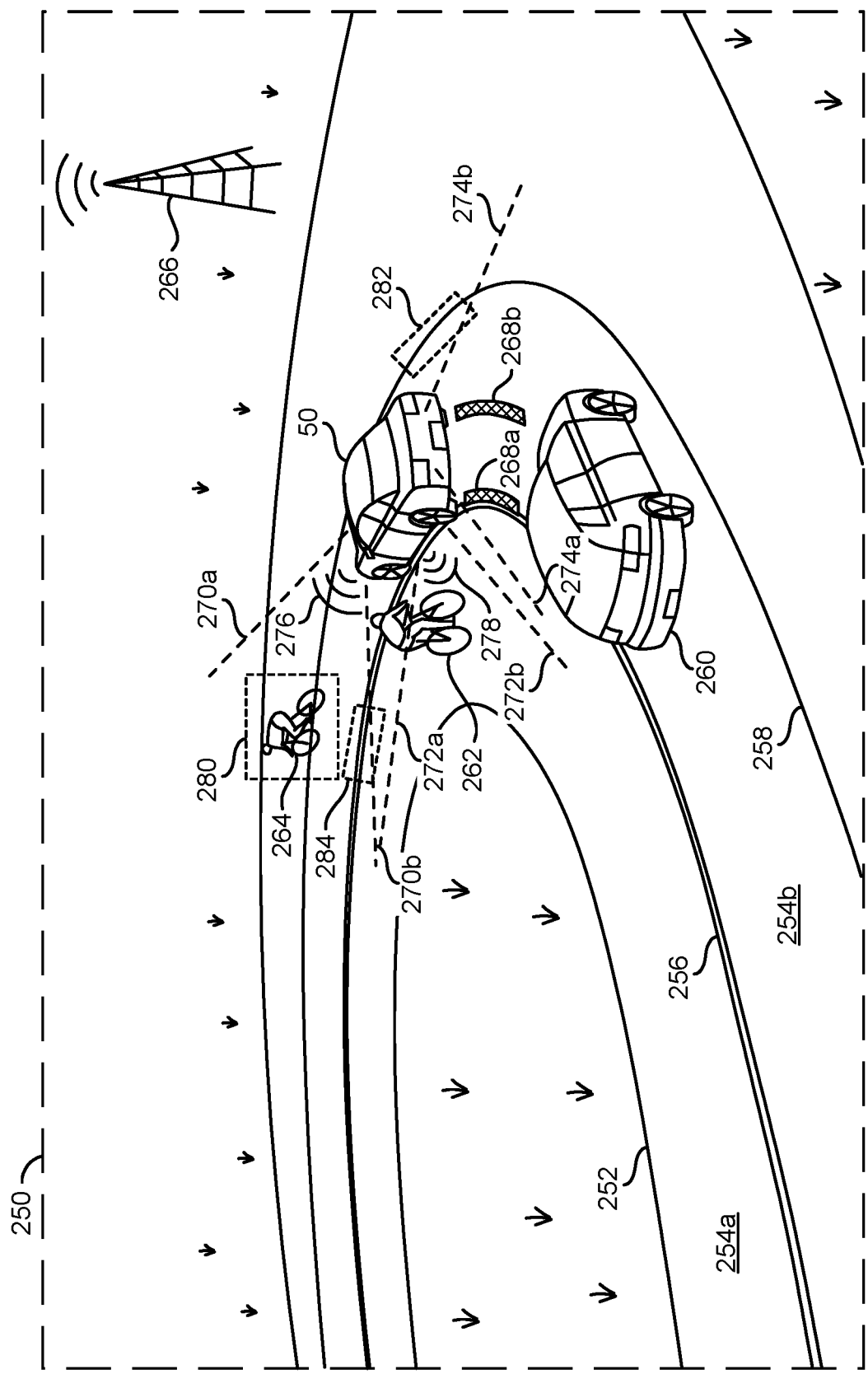
FIG. 5 is a diagram illustrating a driving event detection and validation scenario.

Referring to FIG. 5, a diagram illustrating a driving event detection and validation scenario is shown. A scenario 250 is shown. The scenario 250 may comprise an illustrative example of a driving event detection by the sensor layer 184 and validation of the driving event by the validation layer 182.

The scenario 250 may comprise the vehicle 50 driving on a road 252. The road 252 may comprise a sharp curve. The road 252 may comprise two lanes 254a-254b. A lane divider 256 may separate the lane 254a from the lane 254b. A painted line 258 may indicate an edge of the road 252. The vehicle 50 may be driving in the lane 254b.

A car 260 is shown driving on the road 252 in the lane 254b. For example, the car 260 may be trailing behind the vehicle 50. A cyclist 262 is shown driving on the road 252 in the lane 254a. For example, the cyclist 262 may be riding beside the vehicle 50. A cyclist 264 is shown driving on the road in the lane 254b. For example, the cyclist 264 may be riding in front of the vehicle 50. A tower 266 is shown off the road 252 in the distance. The tower 266 may be a communications tower (e.g., a cell phone tower). Skid marks 268a-268b are shown directly behind the vehicle 50 on the lane 254b. The skid marks 268a-268b may illustrate that the vehicle 50 has performed a harsh brake (e.g., slammed on the brakes causing the vehicle 50 to skid and leave behind the skid marks 268a-268b).

A pair of dashed lines 270a-270b are shown extending from a front end of the vehicle 50. The pair of dashed lines 270a-270b may illustrate a field of view of the forward facing camera 222a. For example, the field of view 270a-270b may capture video frames in front of the vehicle 50. The cyclist 264 is shown within the field of view 270a-270b. In an example, a video processor implemented by the apparatus 100, the camera 222a and/or the vehicle 50 may capture pixel data of the exterior environment 54 in front of the vehicle 50, generate video frames from the pixel data and/or detect objects in the video frames using a computer vision AI model (e.g., an AI model separate from the trained AI model 200).

A pair of dashed lines 272a-272b are shown extending from a driver side of the vehicle 50. The pair of dashed lines 272a-272b may illustrate a field of view of the side facing camera 222d. For example, the field of view 272a-272b may capture video frames out from a driver side of the vehicle 50. The cyclist 262 is shown within the field of view 272a-272b. In an example, a video processor implemented by the apparatus 100, the camera 222d and/or the vehicle 50 may capture pixel data of the exterior environment 54 to the passenger side of the vehicle 50, generate video frames from the pixel data and/or detect objects in the video frames using a computer vision AI model (e.g., an AI model separate from the trained AI model 200).

A pair of dashed lines 274a-274b are shown extending from a rear end of the vehicle 50. The pair of dashed lines 274a-274b may illustrate a field of view of the rear facing camera 222c. For example, the field of view 274a-274b may capture video frames out from the rear of the vehicle 50. The vehicle 260 is shown within the field of view 274a-274b. In an example, a video processor implemented by the apparatus 100, the camera 222c and/or the vehicle 50 may capture pixel data of the exterior environment 54 behind the vehicle 50, generate video frames from the pixel data and/or detect objects in the video frames using a computer vision AI model (e.g., an AI model separate from the trained AI model 200).

Curved lines 276 are shown in front of the vehicle 50. The curved lines 276 may illustrate radar detection performed by the radar data source 224a. The radar detection 276 may determine a proximity to obstacles in front of the vehicle 50. In an example, the radar detection 276 may determine a distance of the cyclist 264 from the front of the vehicle 50.

Curved lines 278 are shown at the driver side of the vehicle 50. The curved lines 278 may illustrate radar detection performed by the radar data source 224a. The radar detection 278 may determine a proximity to obstacles to the side of the vehicle 50. In an example, the radar detection 278 may determine a distance of the cyclist 262 from the side of the vehicle 50.

A dotted box 280, a dotted box 282 and/or a dotted box 284 are shown. The dotted boxes 280a-284 may represent object detection performed at the sensor layer 184. For example, a video processor implemented by the apparatus 100, a video processor implemented by the cameras 222a-222d and/or the vehicle 50 may detect objects in response to computer vision operations performed by a computer vision AI model (e.g., an AI model separate from the trained AI model 200). The dotted box 280 may be around the cyclist 264. The dotted box 282 may be around the painted line 258. The dotted box 284 may be around the lane divider 256.

The apparatus 100 may be configured to receive various driving events and/or parameters in the scenario 250. In an example, the sensor layer 184 may generate driving events and/or provide the driving events and/or the associated sensor parameters in the signal DE/PRM. The signal DE/PRM may be received by the validation layer 182. The AI model 200 may validate one or more potential events and/or determine a context of the potential events. In an example, the various potential driving events and/or associated parameters may comprise the detection 280 of the cyclist 264 and/or the video frames generated by the front camera 222a, the proximity detection 276 and/or the distance measured by the radar data source 224a, a detection of the cyclist 262 and/or video frames generated by the side camera 222d, the proximity detection 278 and/or the distance measured by the radar data source 224a, a detection of the vehicle 260 and/or video frames generated by the rear camera 222c, the harsh brake that resulted in the skid marks 268a-268b generated by the brake data source 224n, the detection 282 of the painted line 258 and/or the associated video frames, the detection 284 of the lane divider 256 and/or the associated video frames, location data (or traffic data or map data) received from the communication tower 266, a detection of the shape of the road, etc. The number of driving events and/or the data sources that provided the data sources (and raw sensor data/parameters, if any) may be varied according to the design criteria of a particular implementation.

In an example, the potential event that may be analyzed by the validation layer 182 may be the harsh brake that resulted in the skid marks 268a-268b. For example, a G-force measurement may have set off the brake sensor data source 224n, which resulted in a potential harsh brake driving event. In an example, an algorithm implemented by the brake sensor data source 224n may determine that the G-force measurement indicates a harsh brake detection. The sensor layer 184 may present the signal DE/PRM to the validation layer 182 comprising the harsh brake detection event along with raw sensor data (e.g., the amount of force and/or direction of force measured).

The processor 102 may run the AI model 200. In response to receiving the potential driving event (e.g., the harsh brake that resulted in the skid marks 268a-268b), the AI model 200 may request other driving events. The driving events requested by the AI model 200 may comprise other driving events that occurred at approximately the same time as the potential driving event (which may include driving events that occurred within some time range before and after the potential driving event). In some embodiments, the sensor layer 184 may continually or continuously present driving events along with associated timestamps to the validation layer 182 and the AI model 200 may determine which of the received driving events may be temporally related to the potential driving event based on the timestamps.

In the scenario 250, the AI model 200 may evaluate many different driving events in order to validate the potential driving event of the harsh brake that resulted in the skid marks 268a-268b. In some embodiments, the AI model 200 may ignore events that may be irrelevant to the current event under investigation based on heuristics and/or assumptions. For example, the AI model 200 may ignore events to the driver side of the vehicle 50 and behind the vehicle 50 based on an assumption that events to the side or rear may not result in a harsh brake. In some embodiments, the AI model 200 may evaluate the proximity detection 278 and/or the video frames of the cyclist 262. In the example shown, the AI model 200 may detect a corner case that the cyclist 262 is driving alongside the vehicle 50 in the oncoming traffic lane 254a (as opposed to driving into the vehicle 50 resulting in a collision that would likely result in the driver slamming the brakes). Since the cyclist 262 is driving alongside the vehicle 50, any driving events associated with the cyclist 262 may not be sufficient to validate the harsh brake driving event (e.g., without other data to support the harsh brake, the harsh brake driving event may be validated as an unnecessary event).

Continuing the example of the harsh brake driving event, the AI model 200 may evaluate driving events and/or parameters associated with the shape of the road 252. For example, the shape of the road (e.g., an unexpected intersection, a pothole, speed bumps, etc.) may be a reason to validate the harsh brake event. The detection 282 of the painted line 258 and/or the detection 284 of the lane divider 256 may indicate the shape of the road 252 is a sharp curve. While the sharp curve may result in the driver slowing down, the sharp curve may not justify the harsh brake (e.g., the driver may have been driving too aggressively for the shape of the road 252).

Continuing the example of the harsh brake driving event, the AI model 200 may evaluate driving events and/or parameters associated with external data received from communication tower 266. For example, traffic conditions, construction, and/or the weather may be reasons to validate the harsh brake event. The cyclist 262 and/or the cyclist 264 may not be captured by traffic data. The weather in the scenario 250 may not be rainy, snowy or icy. For example, the clear weather may not justify the harsh brake event.

Continuing the example of the harsh brake driving event, the AI model 200 may evaluate driving events and/or parameters associated with data from the front end of the vehicle 50. The computer vision AI in the sensor layer 184 may provide the detection 280 of the cyclist in front of the vehicle 50. The detection 280 of the cyclist in front of the vehicle 50 may provide justification for the harsh brake driving event that resulted in the skid marks 268a-268b. In some embodiments, the detection 280 alone may not be sufficient. For example, the additional parameters in the computer vision detection 280 may provide distance information. Similarly, the proximity detection 276 may provide distance information from the vehicle 50 to the cyclist 264. If the cyclist 264 is far in front of the vehicle 50, then the harsh brake may not be justified. If the cyclist 264 is close to the front of the vehicle 50, then the harsh brake may be justified. In some embodiments, additional context in the computer vision results may be relevant to justifying the harsh brake event. For example, if the cyclist 264 crossed over the painted line 258 (e.g., swerved from off the road 252 and into the lane 254b) then the harsh brake may have been justified. The detection 280 of the cyclist 264 may be a sufficient additional driving event that may justify the harsh brake performed by the driver.

In response to the potential harsh brake driving event, the validation layer 182 may generate the signal VAL. The signal VAL may comprise a positive or negative result. For example, the positive result may indicate that the classification of the driving event as a harsh brake was correct and/or a justified action by the driver given the driving scenario 250. For example, the negative result may indicate the classification of the driving event as a harsh brake was incorrect and/or not a justified action by the driver given the driving scenario 250. In some embodiments, the signal VAL may be presented to the fleet manager 152. The fleet manager 152 may use the signal VAL as a data point for determining a driving performance of the driver of the vehicle 50 (along with multiple other validation results that may be generated by the apparatus 100).

Conceptually, the validation layer 182 may be on top of the data (e.g., received by the sensor layer 184). The data in the signal DE/PRM may be processed data. For example, for a harsh brake driving event, one of the data sources 224a-224n may detect the harsh brake driving event based on logic that determines whether a G-force higher than a predetermined amount has been detected (e.g., the data source may have particular rules that detect whether the harsh brake has occurred). Another one of the driving sources 224a-224n may also provide a processed event (e.g., an AI model that performs computer vision) may detect the cyclist 264 based on predetermined rules for detecting an object. Both the harsh brake driving event and the cyclist detected driving event may be communicated from the sensor layer 184 to the validation layer 182. The AI model 200 may evaluate the combination of data coming from the first data source (e.g., a G-force sensor) and a second data source (e.g., the computer vision AI model) to generate the validation result VAL.

Generally, if a harsh brake event is detected, then there should be some other data that justifies the detection of the harsh brake (e.g., a car nearby, a pothole, a cyclist, an animal, ice on the road, etc.). Without another driving event that justifies the harsh brake detection, the potential driving event may not be validated (e.g., a false positive). For example, the G-force sensor that detected the harsh brake may have misfired and/or generated an erroneous detection. The AI model 200 may aggregate all the contextual data from the sensor layer 184 in order to validate whether the harsh brake actually did occur.

The fleet manager 152 may review the validation results generated by the AI model 200. For example, if the driver of the vehicle 50 is performing too many harsh brakes, then that might indicate that the driver is making human errors (e.g., may need retraining, may need to be removed from the job, etc.). For example, based on the validation result that indicates that the harsh brake was justified (e.g., the cyclist 264 swerved in front of the vehicle 50), then the fleet manager 152 may have evidence that the hash brake was not a driver issue (e.g., the driver did not do anything wrong, the driver was not aggressive, everything was normal/proper except for an unexpected circumstance, etc.). The additional data sources (e.g., the computer vision) may provide context that may not be detected by the G-Force detection alone.

Figure 6:
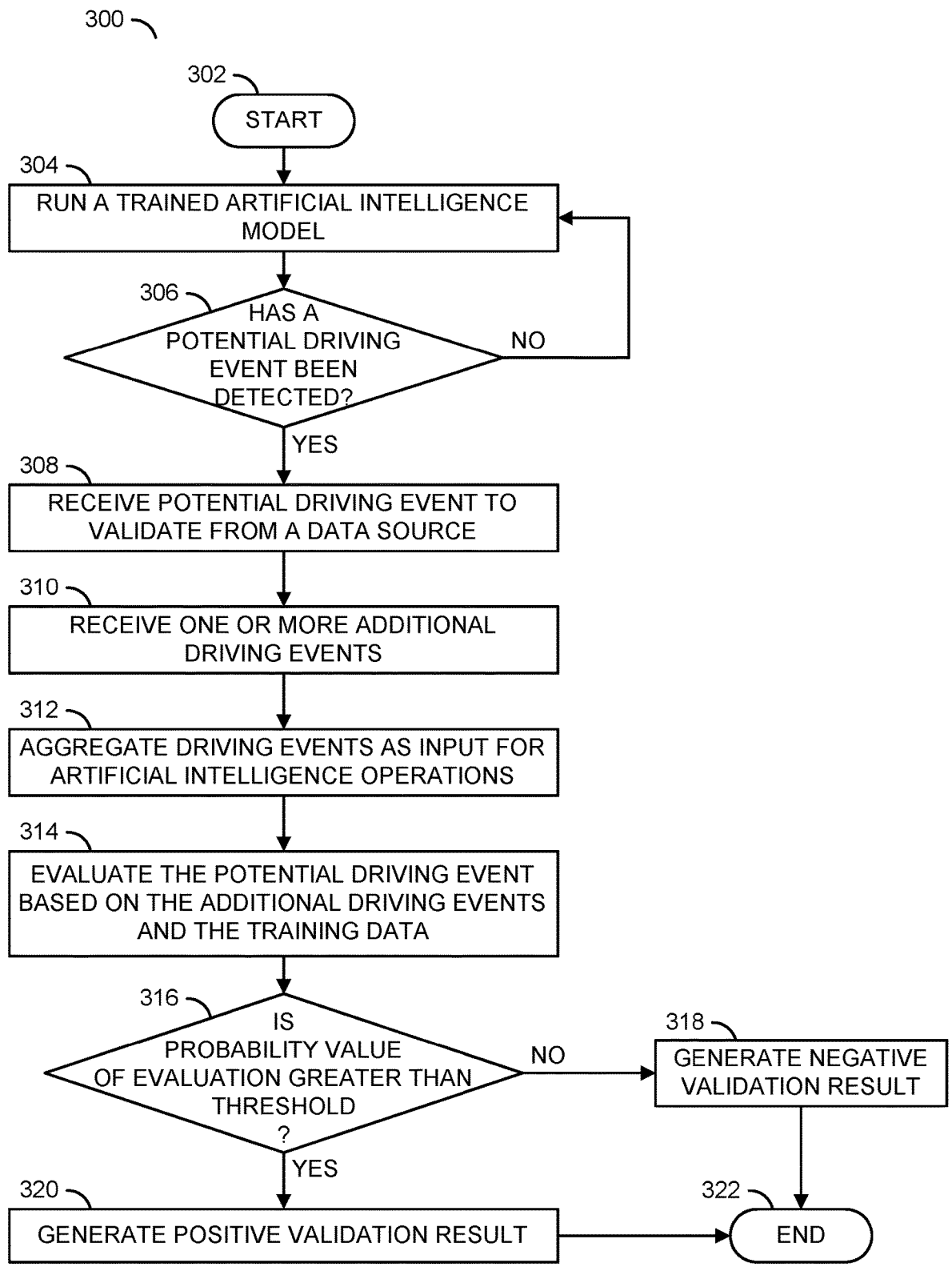
FIG. 6 is a flow diagram illustrating a method for providing event detection and/or validation of driving events by combining two or more or more data sources on a vehicle.

Referring to FIG. 6, a method (or process) 300 is shown. The method 300 may provide event detection and/or validation of driving events by combining two or more or more data sources on a vehicle. The method 300 generally comprises a step (or state) 302, a step (or state) 304, a decision step (or state) 306, a step (or state) 308, a step (or state) 310, a step (or state) 312, a step (or state) 314, a decision step (or state) 316, a step (or state) 318, a step (or state) 320, and a step (or state) 322.

The step 302 may start the method 300. In the step 304, the processor 102 may implement the trained AI model 200. In an example, the processor 102 may implement hardware modules configured to implement the fusion layer 180 and the validation layer 182 and the validation layer 182 may implement the AI model 200. The memory 106 of the apparatus 100 may store computer readable instructions and/or training data. The processor 102 of the apparatus 100 may execute the computer readable instructions to run the trained AI model 200. Next, the method 300 may move to the decision step 306.

In the decision step 306, the validation layer 182 may determine whether a potential driving event has been detected. In an example, the onboard sensors 108 and/or the external sensors 190 implemented at the sensor layer 184 may detect and/or present potential driving events (e.g., a driving event under investigation) to the validation layer 182. If the sensor layer 184 has not detected a potential driving event to investigate, then the method 300 may return to the step 304. If the sensor layer 184 has detected the potential driving event to investigate, then the method 300 may move to the step 308. In the step 308, the AI model 200 may receive the potential driving event to validate from the data source. Next, in the step 310, the validation layer 182 may receive one or more additional driving events. In one example, in response to receiving the potential driving event, the validation layer 182 may send a request to the sensor layer 184 for additional driving events that may have been detected by other of the onboard sensors 108 and/or the external sensors 190. In another example, the sensor layer 184 may continually provide the validation layer 182 with driving events from the onboard sensors 108 and/or the external sensors 190 and the validation layer 182 may determine (e.g., based on driving events having similar timestamps) which of the driving events may be related to the potential driving event and/or may be suitable for validating the potential driving event. Next, the method 300 may move to the step 312.

In the step 312, the AI model 200 may aggregate the driving events (e.g., the potential driving event to validate and the additional driving event(s)) as input for the AI operations. For example, the AI model 200 may perform the AI operations in response to the potential driving event and at least one additional processed driving event. The additional processed driving event may be generated from the same data source or a different data source than the data source that provided potential driving event. Next, in the step 314, the AI model 200 may evaluate the potential driving event based on the additional driving events and the training data. For example, the training data may provide information for detecting specific corner cases that may have been missed at the sensor layer 184. Next, the method 300 may move to the decision step 316.

In the decision step 316, the AI model 200 may determine whether a probability value of the evaluation of the potential driving event is greater than a threshold. For example, the AI model 200 may be configured with a probability threshold. In one example, the probability threshold may be a user defined value. In another example, the probability value may depend on the type of driving event under evaluation (e.g., computer vision driving events may have a higher threshold than driving events detected by an impact sensor). If the probability value is less than or equal to the threshold, then the method 300 may move to the step 318. In the step 318, the AI model 200 may generate a negative result for the validation result. Next, the method 300 may move to the step 322. In the decision step 316, if the probability value is greater than the threshold, then the method 300 may move to the step 320. In the step 320, the AI model 200 may generate a positive result for the validation result. Next, the method 300 may move to the step 320. The step 320 may end the method 300.

Figure 7:
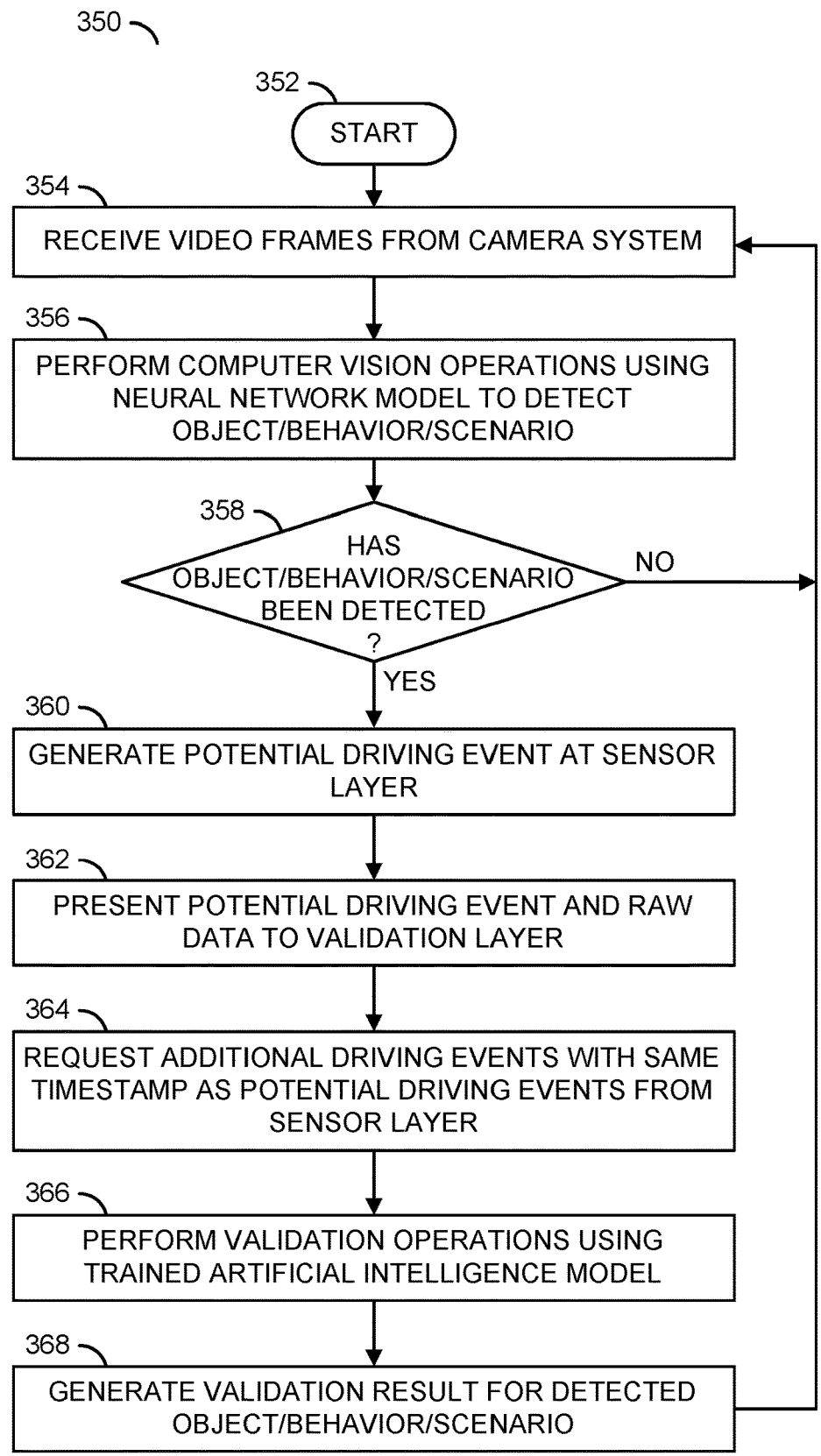
FIG. 7 is a flow diagram illustrating a method for generating a validation result in response to a potential driving event generated from a computer vision AI model.

Referring to FIG. 7, a method (or process) 350 is shown. The method 350 may generate a validation result in response to a potential driving event generated from a computer vision AI model. The method 350 generally comprises a step (or state) 352, a step (or state) 354, a step (or state) 356, a decision step (or state) 358, a step (or state) 360, a step (or state) 362, a step (or state) 364, a step (or state) 366, and a step (or state) 368.

The step 352 may start the method 350. In the step 354, video frames may be received from a camera system. In one example, the processor 102 may implement separate hardware modules configured to perform video processing in response to input received at the lens 110. In another example, the apparatus 100 may implement a video processor distinct from the processor 102 to perform various video operations. In yet another example, a processor implemented by one of the cameras 222a-222d may generate and/or process the video frames. In the step 356, the processor 102 (or a separate processor implemented by the apparatus 100, or a processor in the sensor layer 184) may perform computer vision operations using a computer vision neural network model to detect an object (or behavior or scenario). In an example, an AI model (e.g., a convolutional neural network) distinct from the AI model 200 may perform computer vision operations to detect a processed driving event (e.g., detecting a vehicle, detecting a crash, detecting an intersection, etc.). Next, the method 350 may move to the decision step 358.

In the decision step 358, the computer vision AI model may determine whether the object, event and/or scenario has been detected. In an example, the type of object, event and/or scenario detected may depend on a feature set implemented by the computer vision AI model. If the particular type of object, event and/or scenario has not been detected, then the method 350 may return to the step 354. If the particular type of object, event and/or scenario has been detected, then the method 350 may move to the step 360.

In the step 360, a potential driving event may be generated at the sensor layer 184. For example, the potential driving event may be the detection of the object/behavior/scenario by the computer vision AI model. Next, in the step 362, the sensor layer 184 may present the potential driving event (e.g., the detection by the computer vision AI model) to the validation layer 182. In some embodiments, the sensor layer 184 may further provide the raw data associated with the potential driving event to the validation layer 182 (e.g., the video frames used to detect the potential driving event, the locations of the bounding boxes that indicate the presence of the objects, etc.). Next, the method 350 may move to the step 364.

In the step 364, the validation layer 182 may request additional driving events that have the same timestamp as the potential driving event from the sensor layer 184. In an example, in response to detecting a pedestrian in response to computer vision as a potential driving event, the validation layer 182 may check for any braking events, any proximity detection events (e.g., from radar), any driver related events (e.g., drowsiness detected, driver distraction detected, cell phone user detected, etc.), any lane departure events, etc. Next, in the step 366, AI model 200 may perform the validation operations for the potential driving event. In the step 368, the AI model 200 may generate the validation result for the detected object/behavior/scenario. In an example, if the detection was a pedestrian, the validation result may be a positive result if the detection of the pedestrian was confirmed using the other sources of data and the validation result may be a negative result if the detection of the pedestrian was a false positive (e.g., a shrub on the side of the road was actually present and mistaken for a pedestrian). Next, the method 350 may return to the step 354.

Figure 8:
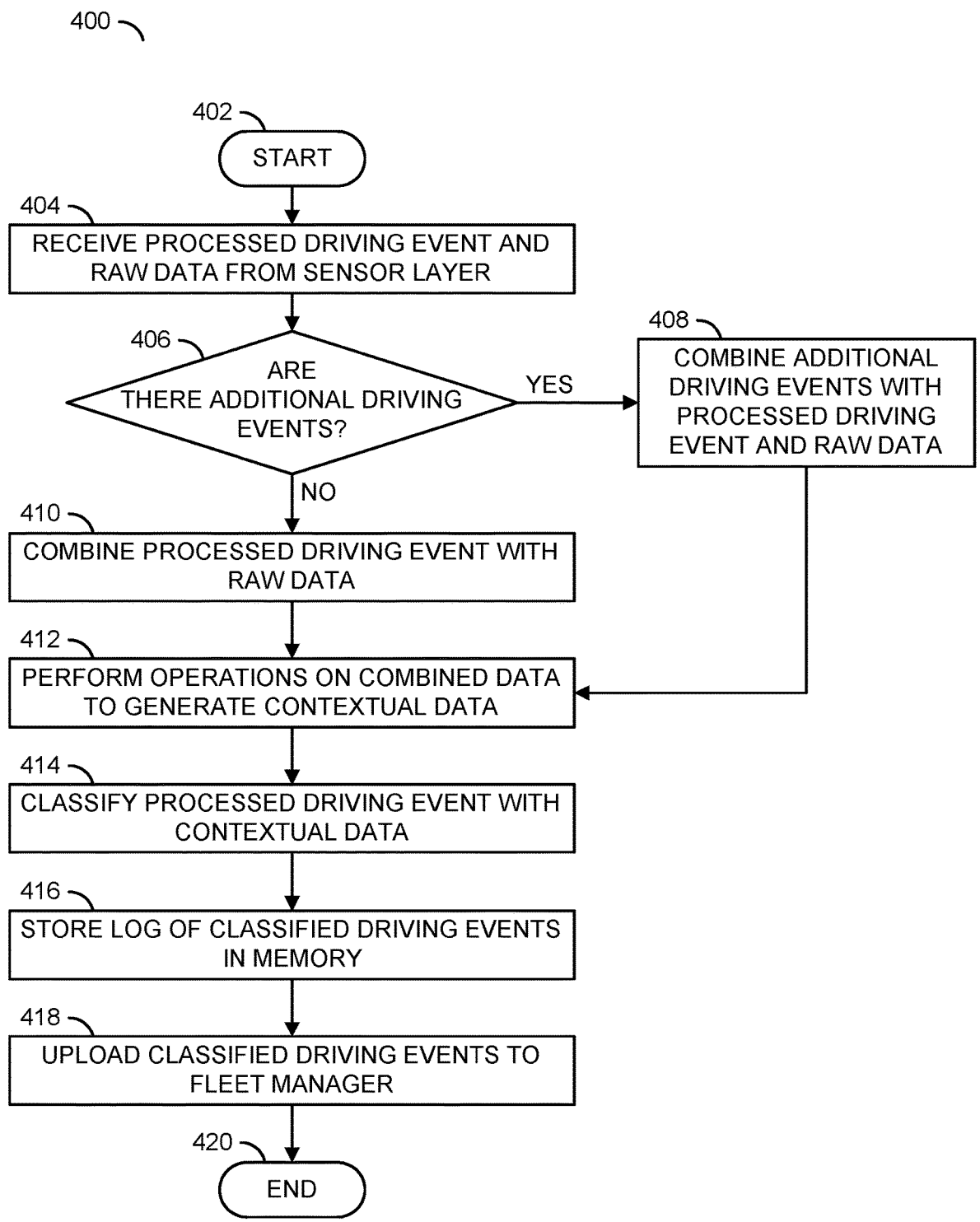
FIG. 8 is a flow diagram illustrating a method for generating contextual data for a driving event.

Referring to FIG. 8, a method (or process) 400 is shown. The method 400 may generate contextual data for a driving event. The method 400 generally comprises a step (or state) 402, a step (or state) 404, a decision step (or state) 406, a step (or state) 408, a step (or state) 410, a step (or state) 412, a step (or state) 414, a step (or state) 416, a step (or state) 418, and a step (or state) 420.

The step 402 may start the method 400. In the step 404, the AI model 200 may receive the processed driving event and the raw data used to generate the processed driving event from the sensor layer 184. In an example for a harsh brake driving event, the raw data may be the G-force measurement and/or an accelerometer measurement. In an example for a computer vision event, the raw data may be video frames and/or bounding boxes associated with the object detection(s) Next, the method 400 may move to the decision step 406.

In the decision step 406, the validation layer 182 may determine whether there are additional driving events available. In an example, the sensor layer 184 may provide additional driving events that may be temporally related to the potential driving event under investigation. If there are additional driving events available, then the method 400 may move to the step 408. In the step 408, the AI model 200 may combine the additional driving events with the processed driving event under investigation and the raw data. Next, the method 400 may move to the step 412. In the decision step 406, if there are no additional driving events, then the method 400 may move to the step 410. In the step 410, the AI model 200 may combine the processed driving event under investigation with the raw data. In some embodiments, the AI model 200 may be capable of determining contextual data for an event (e.g., a severity of an event) based on the raw data used to detect the event alone. Next, the method 400 may move to the step 412.

In the step 412, the AI model 200 may perform the validation operations on the combined data to generate the contextual data. Next, in the step 414, the AI model 200 may classify the processed driving event under investigation with the contextual data. In one example, the classification using the contextual data may comprise a severity of an event. In another example, the classification using the contextual data may comprise a fault of an event (e.g., driver at fault, driver not at fault). In one example, a harsh brake driving event may be classified as a severe harsh brake when weather conditions are bad (e.g., computer vision information and/or third party weather data provides context that the environment is slippery with water, snow or ice). In another example, a cell phone usage driving event may be classified as dangerous when the vehicle 50 is determined to be crossing an intersection and the cell phone usage may be classified as safe when the cell phone usage is detected when the vehicle 50 is pulled over and stopped. In yet another example, an impact driving event may be classified as severe when the computer vision results indicate that a cyclist was in front of the vehicle 50, and the impact driving event may be classified as mild when the computer vision results detect a curb nearby and the speed of the vehicle 50 is slow. In still another example, a lane departure may be classified as driver not at fault if there was a pothole in the current lane that the driver avoided, and the lane departure may be classified as driver at fault if the driver was determined to have been intoxicated, distracted, drowsy, etc. The type of severity (or fault) classification and/or the factors that result in a particular severity rating may be varied according to the design criteria of a particular implementation. Next, the method 400 may move to the step 416.

In the step 416, the processor 102 may store the validation result in the memory 106. For example, the memory 106 may comprise a log of the driving events that have been classified using the validation layer 182. Next, in the step 418, the apparatus 100 may upload the classified driving events to the fleet manager 152. For example, the fleet manager 152 may use the classified driving events to determine whether there are any issues with a particular driver and/or vehicle. Next, the method 400 may move to the step 420. The step 420 may end the method 400.

Figure 9:
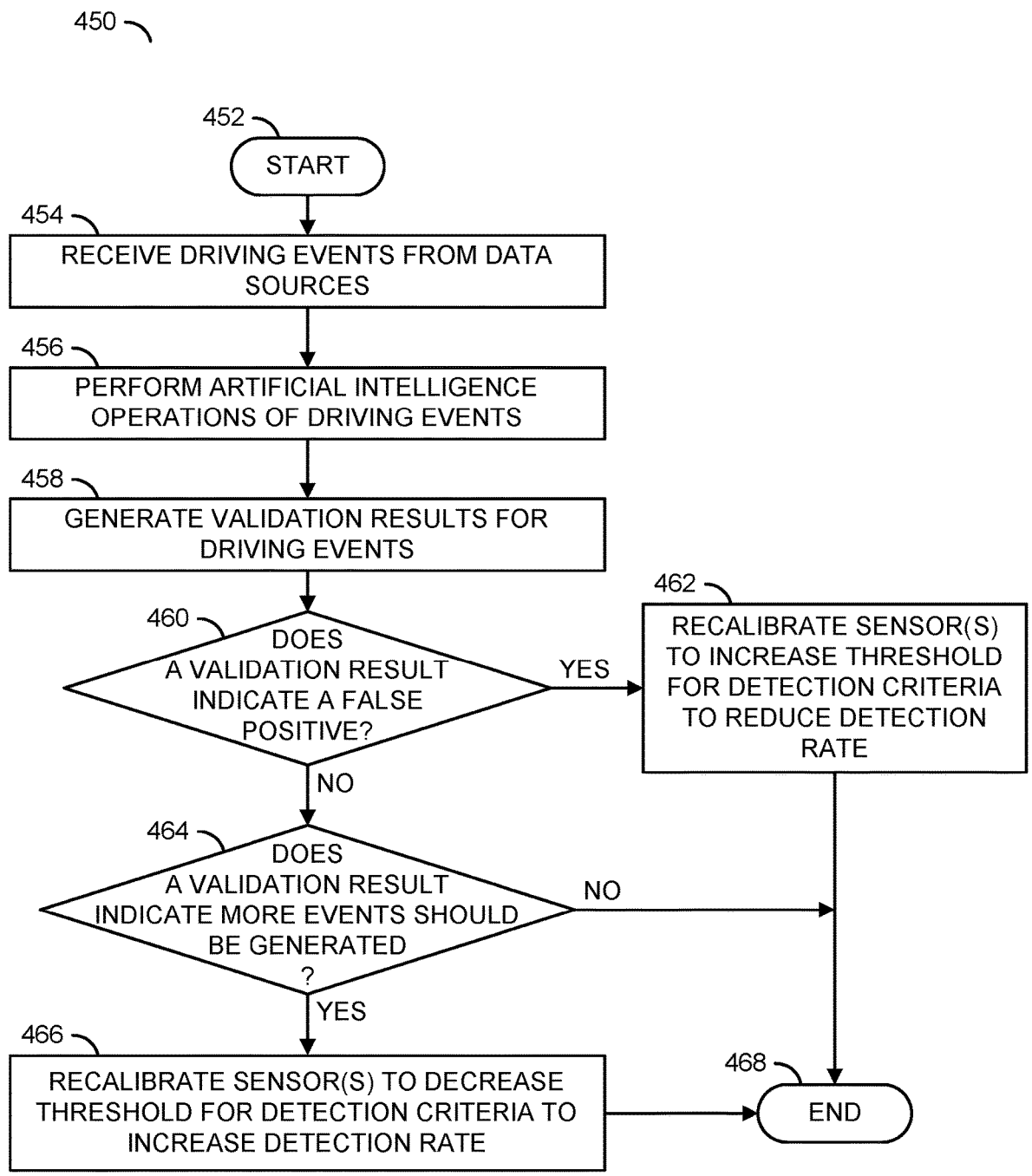
FIG. 9 is a flow diagram illustrating a method for adjusting a detection rate for a sensor in response to a validation result.

Referring to FIG. 9, a method (or process) 450 is shown. The method 450 may adjust a detection rate for a sensor in response to a validation result. The method 450 generally comprises a step (or state) 452, a step (or state) 454, a step (or state) 456, a step (or state) 458, a decision step (or state) 460, a step (or state) 462, a decision step (or state) 464, a step (or state) 466, and a step (or state) 468.

The step 452 may start the method 450. In the step 454, the AI model 200 may receive driving events from the various data sources (e.g., the onboard sensors 108, the cameras 222a-222d and/or the data sources 224a-224n).

Next, in the step 456, the AI model 200 may perform the AI operations on the driving events. In the step 458, the AI model 200 may generate the validation results for the driving events. Next, the method 450 may move to the decision step 460.

In the decision step 460, the AI model 200 may determine whether the validation result indicates a false positive. If the validation result indicates a false positive, then the method 450 may move to the step 462. In the step 462, the processor 102 may generate a signal configured to recalibrate one or more sensors to increase a threshold for the detection criteria of the driving events in order to reduce a detection rate. For example, if the proximity sensor generates multiple driving events indicating an object is near the vehicle 50 and the AI model 200 does not validate the results, a sensitivity of the proximity sensor may be too high and the proximity sensor may be recalibrated so that fewer detections are made. Next, the method 450 may move to the step 468. In the decision step 460, if the validation result does not indicate a false positive has been detected, then the method 450 may move to the decision step 464.

In the decision step 464, the AI model 200 may determine whether the validation result indicates that more events should be generated. Implementing the validation layer 182 may enable various sensors to be more sensitive than if the validation layer 182 were not implemented. For example, since the validation layer 182 may be capable of filtering false positive, detection rates may be increased to ensure all events are detected (even unlikely events). If the validation result does not indicate that more events should be generated, then the method 450 may move to the step 468. If the validation result does indicate that more events should be generated, then the method 450 may move to the step 466. In the step 466, the processor 102 may generate a signal configured to recalibrate one or more sensors to decrease a threshold for the detection criteria of the driving events in order to increase a detection rate. For example, the proximity sensor may be recalibrated to detect more events, even if some of the events end up being false positives, and the validation layer 182 may filter out the false positives. With more proximity events being detected, there may be more data available for the validation layer 182 and/or the fusion layer 180 to base decisions from. Next, the method 450 may move to the step 468. The step 468 may end the method 450.

The functions performed by the diagrams of FIGS. 1-9 may be implemented using one or more of a conventional general purpose processor, digital computer, microprocessor, microcontroller, RISC (reduced instruction set computer) processor, CISC (complex instruction set computer) processor, SIMD (single instruction multiple data) processor, signal processor, central processing unit (CPU), arithmetic logic unit (ALU), video digital signal processor (VDSP) and/or similar computational machines, programmed according to the teachings of the specification, as will be apparent to those skilled in the relevant art(s). Appropriate software, firmware, coding, routines, instructions, opcodes, microcode, and/or program modules may readily be prepared by skilled programmers based on the teachings of the disclosure, as will also be apparent to those skilled in the relevant art(s). The software is generally executed from a medium or several media by one or more of the processors of the machine implementation.

The invention may also be implemented by the preparation of ASICs (application specific integrated circuits), Platform ASICs, FPGAs (field programmable gate arrays), PLDs (programmable logic devices), CPLDs (complex programmable logic devices), sea-of-gates, RFICs (radio frequency integrated circuits), ASSPs (application specific standard products), one or more monolithic integrated circuits, one or more chips or die arranged as flip-chip modules and/or multi-chip modules or by interconnecting an appropriate network of conventional component circuits, as is described herein, modifications of which will be readily apparent to those skilled in the art (s).

The invention thus may also include a computer product which may be a storage medium or media and/or a transmission medium or media including instructions which may be used to program a machine to perform one or more processes or methods in accordance with the invention. Execution of instructions contained in the computer product by the machine, along with operations of surrounding circuitry, may transform input data into one or more files on the storage medium and/or one or more output signals representative of a physical object or substance, such as an audio and/or visual depiction. Execution of instructions contained in the computer product by the machine, may be executed on data stored on a storage medium and/or user input and/or in combination with a value generated using a random number generator implemented by the computer product. The storage medium may include, but is not limited to, any type of disk including floppy disk, hard drive, magnetic disk, optical disk, CD-ROM, DVD and magneto-optical disks and circuits such as ROMs (read-only memories), RAMs (random access memories), EPROMs (erasable programmable ROMs), EEPROMs (electrically erasable programmable ROMs), UVPROMs (ultra-violet erasable programmable ROMs), Flash memory, magnetic cards, optical cards, and/or any type of media suitable for storing electronic instructions.

The elements of the invention may form part or all of one or more devices, units, components, systems, machines and/or apparatuses. The devices may include, but are not limited to, servers, workstations, storage array controllers, storage systems, personal computers, laptop computers, notebook computers, palm computers, cloud servers, personal digital assistants, portable electronic devices, battery powered devices, set-top boxes, encoders, decoders, transcoders, compressors, decompressors, pre-processors, post-processors, transmitters, receivers, transceivers, cipher circuits, cellular telephones, digital cameras, positioning and/or navigation systems, medical equipment, heads-up displays, wireless devices, audio recording, audio storage and/or audio playback devices, video recording, video storage and/or video playback devices, game platforms, peripherals and/or multi-chip modules. Those skilled in the relevant art(s) would understand that the elements of the invention may be implemented in other types of devices to meet the criteria of a particular application.

The terms "may" and "generally" when used herein in conjunction with "is(are)" and verbs are meant to communicate the intention that the description is exemplary and believed to be broad enough to encompass both the specific examples presented in the disclosure as well as alternative examples that could be derived based on the disclosure. The terms "may" and "generally" as used herein should not be construed to necessarily imply the desirability or possibility of omitting a corresponding element.

The designations of various components, modules and/or circuits as "a"-"n", when used herein, disclose either a singular component, module and/or circuit or a plurality of such components, modules and/or circuits, with the "n" designation applied to mean any particular integer number. Different components, modules and/or circuits that each have instances (or occurrences) with designations of "a"-"n" may indicate that the different components, modules and/or circuits may have a matching number of instances or a different number of instances. The instance designated "a" may represent a first of a plurality of instances and the instance "n" may refer to a last of a plurality of instances, while not implying a particular number of instances.

While the invention has been particularly shown and described with reference to embodiments thereof, it will be understood by those skilled in the art that various changes in form and details may be made without departing from the scope of the invention.

The invention claimed is:

1. An apparatus comprising:
an onboard sensor configured to generate sensor data and determine a processed event in response to said sensor data;
an interface configured to receive (i) a first processed event determined in response to a detection criteria implemented by a first data source in response to first sensor data and (ii) a second processed event determined by a second data source in response to second sensor data generated independently from said first sensor data; and
a processor configured to (i) request said second processed event within a range of a timestamp of said first processed event in response to said first processed event and (ii) run a trained artificial intelligence model configured to (a) aggregate at least said first processed event and said second processed event as input, (b) perform an evaluation for said first processed event in response to a validation threshold and said input and (c) generate a validation result for said first processed event in response to said evaluation, wherein
(a) said validation result comprises a binary output that provides an independent confirmation of an occurrence of said first processed event,
(b) said trained artificial intelligence model operates independently from said first data source and said second data source to enable (I) said validation threshold for said evaluation of said first processed event to be adjustable without affecting said detection criteria for said first processed event and (II) said detection criteria for said first processed event to be adjustable without affecting said validation threshold for said evaluation of said first processed event by said trained artificial intelligence model, and
(c) said processed event generated by said onboard sensor is at least one of said first processed event and said second processed event.

2. The apparatus according to claim 1, wherein (i) at least one of said first processed event and said second processed event are determined in response to an analysis by a second artificial intelligence model and (ii) said second artificial intelligence model is trained independently from said trained artificial intelligence model.

3. The apparatus according to claim 2, wherein (i) said second artificial intelligence model is configured to detect objects using computer vision operations and (ii) said onboard sensor is a video camera configured to implement said second artificial intelligence model.

4. The apparatus according to claim 1, wherein (i) said first data source is configured to provide said first sensor data used to generate said first processed event and said second data source is configured to provide said second sensor data used to generate said second processed event and (ii) said first sensor data and said second sensor data are used by said trained artificial intelligence model to generate said input.

5. The apparatus according to claim 1, wherein (i) said evaluation comprises determining a probability value, (ii) said probability value is compared to a validation threshold and (iii) said binary output provides said independent confirmation when said probability value is greater than said validation threshold.

6. The apparatus according to claim 1, wherein said first processed event is determined to be a false positive in response to said binary output comprising a negative result.

7. The apparatus according to claim 1, wherein said binary output is presented to a fusion layer.

8. The apparatus according to claim 1, wherein said processor is further configured to perform a calibration of said first data source in response to said binary output.

9. The apparatus according to claim 1, wherein said trained artificial intelligence model is further configured to determine a severity of said first processed event in response to said binary output and said input.

10. The apparatus according to claim 1, wherein said processor comprises hardware modules designed to implement application specific tasks for accelerated artificial intelligence operations.

11. The apparatus according to claim 1, wherein (i) said interface is further configured to receive additional processed events from a plurality of data sources and (ii) said trained artificial intelligence model is configured to aggregate said first processed event, said second processed event and said additional processed events as said input.

12. The apparatus according to claim 11, wherein said trained artificial intelligence model is further configured to combine said additional processed events with said first processed event and said second processed event to generate contextual data.

13. The apparatus according to claim 1, wherein (i) said apparatus is implemented in a vehicle and (ii) said first processed event and said second processed event each comprise driving events.

14. The apparatus according to claim 13, wherein (i) said validation result for said first processed event is stored in a memory and (ii) said memory comprises a log of said driving events.

15. The apparatus according to claim 1, wherein said trained artificial intelligence model is configured to determine said validation result for a corner case scenario that a second artificial intelligence model that generated said first processed event has not been trained to detect.

16. The apparatus according to claim 15, wherein (i) said apparatus is implemented in each vehicle of a fleet of vehicles, (ii) said trained artificial intelligence model is trained to detect said corner case scenario in response to training data gathered from said fleet of vehicles and (iii) said corner case scenario is a narrow subset of a detection performed by said second artificial intelligence model.

17. The apparatus according to claim 1, wherein said apparatus is configured to provide event detection and validation by combining two or more data sources on a vehicle.

18. The apparatus according to claim 1, wherein (i) said processor is configured to generate a signal in response to said binary output, (ii) said signal is configured to perform a recalibration of said first data source, (iii) said recalibration increases a detection rate of said first processed event in response to said binary output verifying that said first processed event has occurred and (iv) said recalibration decreases a detection rate of said first processed event in response to said binary output detecting a false positive for said first processed event.

* * * * *